United States Patent
Miwa et al.

(10) Patent No.: US 10,876,590 B2
(45) Date of Patent: Dec. 29, 2020

(54) DAMPING FORCE VARIABLE SHOCK ABSORBER

(71) Applicant: Showa Corporation, Gyoda (JP)

(72) Inventors: Kazuhiro Miwa, Fukuroi (JP); Naoya Kuroiwa, Fukuroi (JP)

(73) Assignee: Showa Corporation, Gyoda (JP)

( * ) Notice: Subject to any disclaimer, the term of this patent is extended or adjusted under 35 U.S.C. 154(b) by 0 days.

(21) Appl. No.: 16/359,580

(22) Filed: Mar. 20, 2019

(65) Prior Publication Data

US 2019/0219126 A1    Jul. 18, 2019

Related U.S. Application Data

(62) Division of application No. 15/184,534, filed on Jun. 16, 2016, now abandoned.

(30) Foreign Application Priority Data

Jun. 17, 2015   (JP) .................................. 2015-122328

(51) Int. Cl.
  *F16F 9/34*   (2006.01)
  *F16F 9/46*   (2006.01)
  (Continued)

(52) U.S. Cl.
  CPC .............. *F16F 9/464* (2013.01); *B62K 25/08* (2013.01); *F16F 9/185* (2013.01); *F16F 9/46* (2013.01);
  (Continued)

(58) Field of Classification Search
  CPC ............. F16F 9/062; F16F 9/185; F16F 9/465
  See application file for complete search history.

(56) References Cited

U.S. PATENT DOCUMENTS 5,147,018 A    9/1992   Kobori et al.
5,551,541 A    9/1996   Forster
  (Continued)

FOREIGN PATENT DOCUMENTS

EP    1820996 A    8/2007
EP    2413003 A1   2/2012
  (Continued)

OTHER PUBLICATIONS

Office Action dated Jan. 15, 2019 for the corresponding Japanese Patent Application No. 2015-122328.
  (Continued)

*Primary Examiner* — Nicholas J Lane
(74) *Attorney, Agent, or Firm* — Leason Ellis LLP

(57) ABSTRACT

There is provided a compact damping force variable shock absorber capable of implementing different adjustments for a compression-side stroke and an extension-side stroke as initial settings. A damping force variable device in one embodiment includes: a main valve that opens and closes to control flow of oil caused by sliding of a piston in a cylinder, thereby generating damping force; a pilot chamber into which a portion of the flow of the oil is introduced so that internal pressure is applied to the main valve in a valve-closing direction; a pilot valve that opens and closes to adjust the internal pressure of the pilot chamber; and a communication passage that communicates the pilot chamber with a rod-side oil chamber or a piston-side fluid chamber.

8 Claims, 14 Drawing Sheets

(51) Int. Cl.
  *F16F 9/18* (2006.01)
  *B62K 25/08* (2006.01)
  *B62M 7/00* (2010.01)
  *F16F 13/00* (2006.01)

(52) U.S. Cl.
  CPC ............... *F16F 9/465* (2013.01); *B62M 7/00* (2013.01); *F16F 13/007* (2013.01); *F16F 2228/066* (2013.01)

(56) References Cited

U.S. PATENT DOCUMENTS

| | | | |
|---|---|---|---|
| 6,119,831 A * | 9/2000 | Knecht | F16F 9/46 188/282.2 |
| 6,269,918 B1 | 8/2001 | Kurusu et al. | |
| 6,817,454 B2 | 11/2004 | Nezu et al. | |
| 9,732,819 B2 | 8/2017 | Kim | |
| 9,739,332 B2 | 8/2017 | Kim | |
| 9,796,236 B2 | 10/2017 | Inagaki et al. | |
| 2003/0173170 A1* | 9/2003 | Nagai | F16F 9/185 188/316 |
| 2007/0227843 A1 | 10/2007 | Park | |
| 2009/0084647 A1 | 4/2009 | Maneyama et al. | |
| 2011/0168935 A1 | 7/2011 | Heyn et al. | |
| 2012/0097493 A1 | 4/2012 | Ewers et al. | |
| 2012/0273311 A1 | 11/2012 | Beck | |
| 2013/0299291 A1 | 11/2013 | Ewers et al. | |
| 2013/0341540 A1 | 12/2013 | Manger et al. | |
| 2014/0231199 A1 | 8/2014 | Kim et al. | |
| 2014/0353099 A1 | 12/2014 | Yamashita et al. | |
| 2015/0275999 A1 | 10/2015 | Mori et al. | |
| 2016/0040742 A1 | 2/2016 | Yamashita et al. | |
| 2016/0236553 A1 | 8/2016 | Stewart et al. | |
| 2017/0080767 A1 | 3/2017 | Yamashita et al. | |
| 2017/0120716 A1 | 5/2017 | Sakai | |
| 2017/0152910 A1 | 6/2017 | Schaffelhofer et al. | |
| 2017/0268595 A1* | 9/2017 | Inagaki | F16F 9/34 |
| 2017/0328440 A1 | 11/2017 | Sakuta et al. | |

FOREIGN PATENT DOCUMENTS

| | | |
|---|---|---|
| EP | 2937596 A | 10/2015 |
| JP | 2000-193014 A | 7/2000 |
| JP | 2003-194133 A | 7/2003 |
| JP | 2007-225111 A | 9/2007 |
| JP | 2008-138757 A | 6/2008 |
| JP | 2009-281584 A | 12/2009 |
| JP | 2010-223413 A | 10/2010 |
| JP | 2010-236577 A | 10/2010 |
| JP | 2015-007469 A | 1/2015 |

OTHER PUBLICATIONS

Extended European Search Report dated Dec. 13, 2016 for the corresponding European Patent Application No. 16174904.9.
Office Action dated Aug. 24, 2018 for the parent U.S. Appl. No. 15/184,534.
Office Action dated Apr. 3, 2018 for the parent U.S. Appl. No. 15/184,534.
Office Action dated Dec. 20, 2017 for the parent U.S. Appl. No. 15/184,534.

* cited by examiner

DAMPING FORCE VARIABLE SHOCK ABSORBER

CROSS-REFERENCE TO RELATED APPLICATION(S)

This application is a Divisional of U.S. patent application Ser. No. 15/184,534 filed Jun. 16, 2016, which claims priority from Japanese Patent Application No. 2015-122328 filed on Jun. 17, 2015, the entire contents of both of which are incorporated herein by reference.

BACKGROUND OF THE INVENTION

1. Field of the Invention

Embodiments of the present invention relate to a damping force variable shock absorber.

2. Description of the Related Art

In a two-wheeled motor vehicle, a wheel may be connected to a vehicle body frame via a shock absorber. Examples of the shock absorber include a damping force adjustment-type shock absorber that controls flow of operating fluid (oil) to adjust damping force. For example, JP-2009-281584-A discloses a shock absorber.

In a damping force adjustment-type shock absorber, damping force may be adjusted using the same control valve in a compression-side stroke and an extension-side stroke. A damping force balance between the compression-side stroke and the extension-side stroke is determined by structural factors such as a piston diameter and a piston rod diameter that give influence on an amount of the operating fluid (oil) flowing in the shock absorber, for example.

In such damping force adjustment-type shock absorber, since the damping force balance between the compression-side stroke and the extension-side stroke is determined by structural factors such as the piston diameter and the piston rod diameter, it is difficult to decrease or increase the damping force in any one of the strokes.

Besides, when the damping force is controlled, a method of electronically controlling the control valve using a solenoid or the like may be used. However, when the control valve is electronically controlled, a response delay or the like may occur.

For example, in such damping force adjustment-type shock absorber, the damping force is generated by a back pressure-type main valve and a pressure control valve that generate damping force by controlling the flow of the fluid. The pressure control valve generates the damping force directly and adjusts internal pressure of a pilot chamber to control valve-opening pressure of the main valve. In this case, a damping force adjustment mechanism in which one main valve, one pilot chamber, and one pressure control valve are used for both the compression-side stroke and the extension-side stroke is provided. Since only one set of these members are present, the damping force adjustment mechanism can have a compact configuration.

However, when the damping force is adjusted by solenoid-based electronic control using one damping force adjustment mechanism which includes one main valve, one pilot chamber, and one pressure control valve, since fluid flows through the same main valve, pilot chamber, and pressure control valve for both the compression-side stroke and the extension-side stroke, the damping force is adjusted in the same manner for both the compression-side stroke and the extension-side stroke. Thus, it is difficult for one damping force adjustment mechanism which uses electronic control to realize different adjustments during the compression-side stroke and the extension-side stroke as initial settings.

Further, although separate damping force adjustment mechanisms may be provided for respective strokes in order to adjust the damping force in the compression-side stroke and the extension-side stroke, the structure may become complex and the manufacturing cost may increase.

SUMMARY OF THE INVENTION

An object of the present invention is to provide a compact damping force variable shock absorber capable of realizing different adjustments for a compression-side stroke and an extension-side stroke as initial settings.

According to an embodiment, a damping force variable shock absorber includes: a cylinder in which fluid is enclosed; a piston slidably fitted into the cylinder; a piston rod having one end connected to the piston and the other end extended outside the cylinder; a rod-side fluid chamber partitioned by the piston and provided closer to the other end in an axial direction of the cylinder than the piston; a piston-side fluid chamber provided closer to one end in the axial direction of the cylinder than the piston; and a damping force variable device that controls flow of fluid enclosed in the cylinder so that damping force can be varied.

The damping force variable device includes: a main valve that opens and closes to control the flow of the fluid caused by sliding of the piston in the cylinder, thereby generating the damping force; a pilot chamber into which a portion of the flow of the fluid is introduced so that internal pressure is applied to the main valve in a valve-closing direction; a pilot valve that opens and closes to adjust the internal pressure of the pilot chamber; and a communication passage that allows the pilot chamber or a passage between the pilot chamber and the pilot valve to communicate with the rod-side fluid chamber.

According to the damping force variable shock absorber of the present invention, it is possible to provide a compact damping force variable shock absorber capable of realizing different adjustments during the compression-side stroke and the extension-side stroke as initial settings.

DESCRIPTION OF THE PREFERRED EMBODIMENTS

Hereinafter, embodiments of the present invention will be described with reference to the drawings.

First Embodiment

Figure 1:
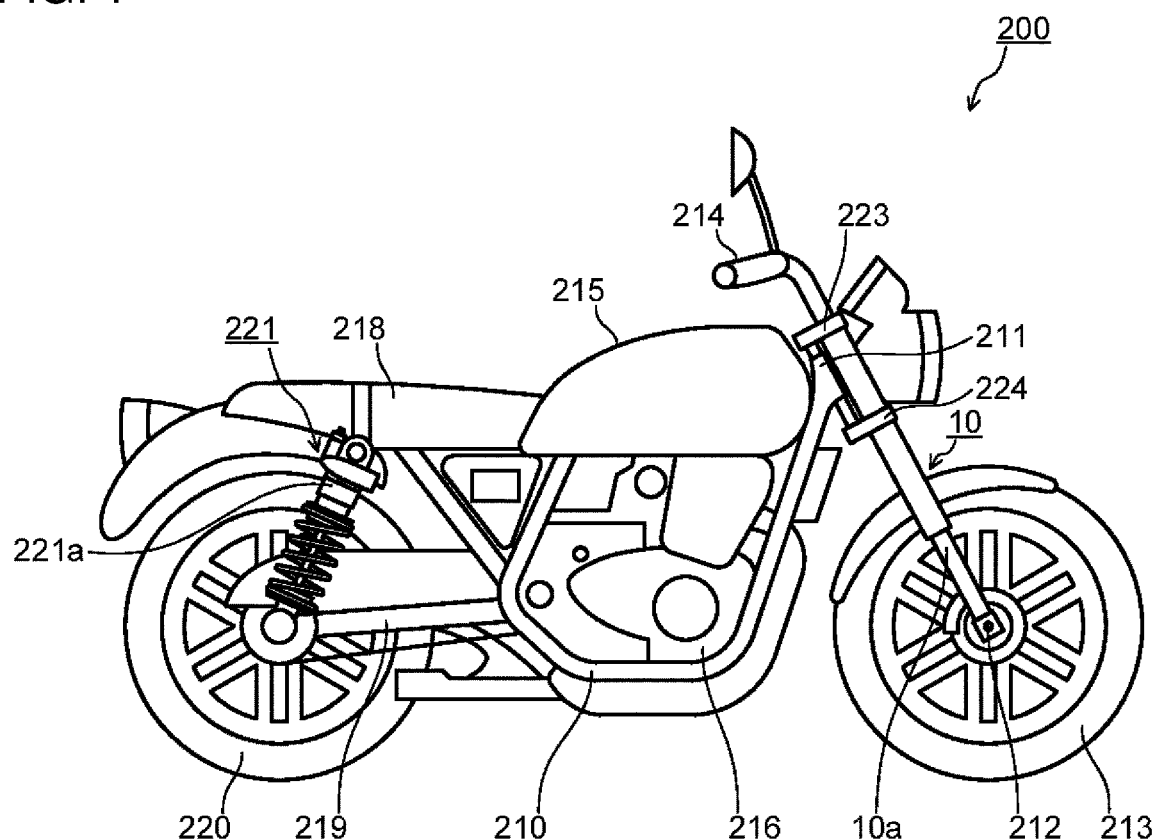
FIG. 1 is a schematic diagram of a two-wheeled motor vehicle having a damping force variable shock absorber according to a first embodiment.

FIG. 1 is a schematic diagram of a two-wheeled motor vehicle 200 having a damping force variable shock absorber according to a first embodiment. In the present embodiment, a front fork 10 is illustrated as an example of a damping force variable shock absorber. That is, the front fork 10 functions as a damping force variable shock absorber.

As illustrated in FIG. 1, the two-wheeled motor vehicle 200 includes a vehicle body frame 210 that constitutes a part of a vehicle body, a head pipe 211 attached to a front end of the vehicle body frame 210, a front fork 10 provided on the head pipe 211, and a front wheel 213 attached to a lower end of the front fork 10 with an axle 212 interposed.

The front fork 10 is disposed so as to sandwich the front wheel 213 from left and right sides. Specifically, the front fork 10 includes a first leg 10a and a second leg 10b (not illustrated). Only the first leg 10a disposed on the right side in a traveling direction is illustrated in FIG. 1. Although an example in which the first leg 10a is provided on the right side in the traveling direction is illustrated, the first leg 10a may be provided on the left side in the traveling direction. A specific configuration of the front fork 10 will be described later.

The two-wheeled motor vehicle 200 includes a handlebar 214 attached to an upper portion of the front fork 10, a fuel tank 215 attached to a front upper portion of the vehicle body frame 210, and an engine 216 disposed on a lower side of the fuel tank 215.

The two-wheeled motor vehicle 200 includes a seat 218 attached to a rear upper portion of the vehicle body frame 210, a swing arm 219 attached to a lower portion of the vehicle body frame 210 so as to freely swing, a rear wheel 220 attached to a rear end of the swing arm 219, and a pair of left and right rear suspensions 221 attached between the swing arm 219 and the vehicle body frame 210. The pair of rear suspensions 221 are disposed on left and right sides of the rear wheel 220, respectively. Only a rear suspension 221a disposed on the right side in the traveling direction is illustrated in FIG. 1. Further, the two-wheeled motor vehicle 200 includes a controller 222 that controls the entire two-wheeled motor vehicle 200.

The vehicle body frame 210 is a frame that supports functional members constituting the vehicle body such as the fuel tank 215, the engine 216, and the like, for example. The head pipe 211 is an approximately cylindrical member. A handlebar rotation shaft (not illustrated) provided integrally with the handlebar 214 and the front fork 10 is inserted into the head pipe 211, and the head pipe 211 rotatably supports the handlebar rotation shaft.

The front wheel 213 is a vehicle wheel disposed on the front side in the traveling direction of the vehicle body frame 210. The handlebar 214 is a member that is disposed on the front side in the traveling direction of the vehicle body frame 210 and is grasped by a driver in order to steer the two-wheeled motor vehicle 200. The fuel tank 215 is a container that is disposed on an upper side of the vehicle body frame 210 so as to store fuel therein. The engine 216 is a driving source that supplies driving force for rotating the rear wheel 220.

The seat 218 is a saddle-type seat which is disposed on the upper side of the vehicle body frame 210 and on which the driver rides. The swing arm 219 is a member of which the front end in the traveling direction is swingably supported on the vehicle body frame 210 and of which the rear end in the traveling direction supports the rear wheel 220. The swing arm 219 swings about the front end in the traveling direction so as to follow movement of the rear wheel 220. The rear wheel 220 is a vehicle wheel disposed on the rear side in the traveling direction of the vehicle body frame 210.

The rear suspension 221 is a shock absorbing device that suppresses shock applied to the rear wheel 220 due to unevenness on a road surface from being transmitted to the vehicle body frame 210.

(Configuration of Front Fork 10)

Next, a configuration of the front fork 10 which is a damping force variable shock absorber according to the first embodiment will be described.

As described above, the front fork 10 includes the pair of first and second legs 10a and 10b. In the front fork 10 illustrated in FIG. 1, the first and second legs 10a and 10b have the same configuration, for example. Thus, the configuration of the first leg 10a will be described below.

Figure 2:
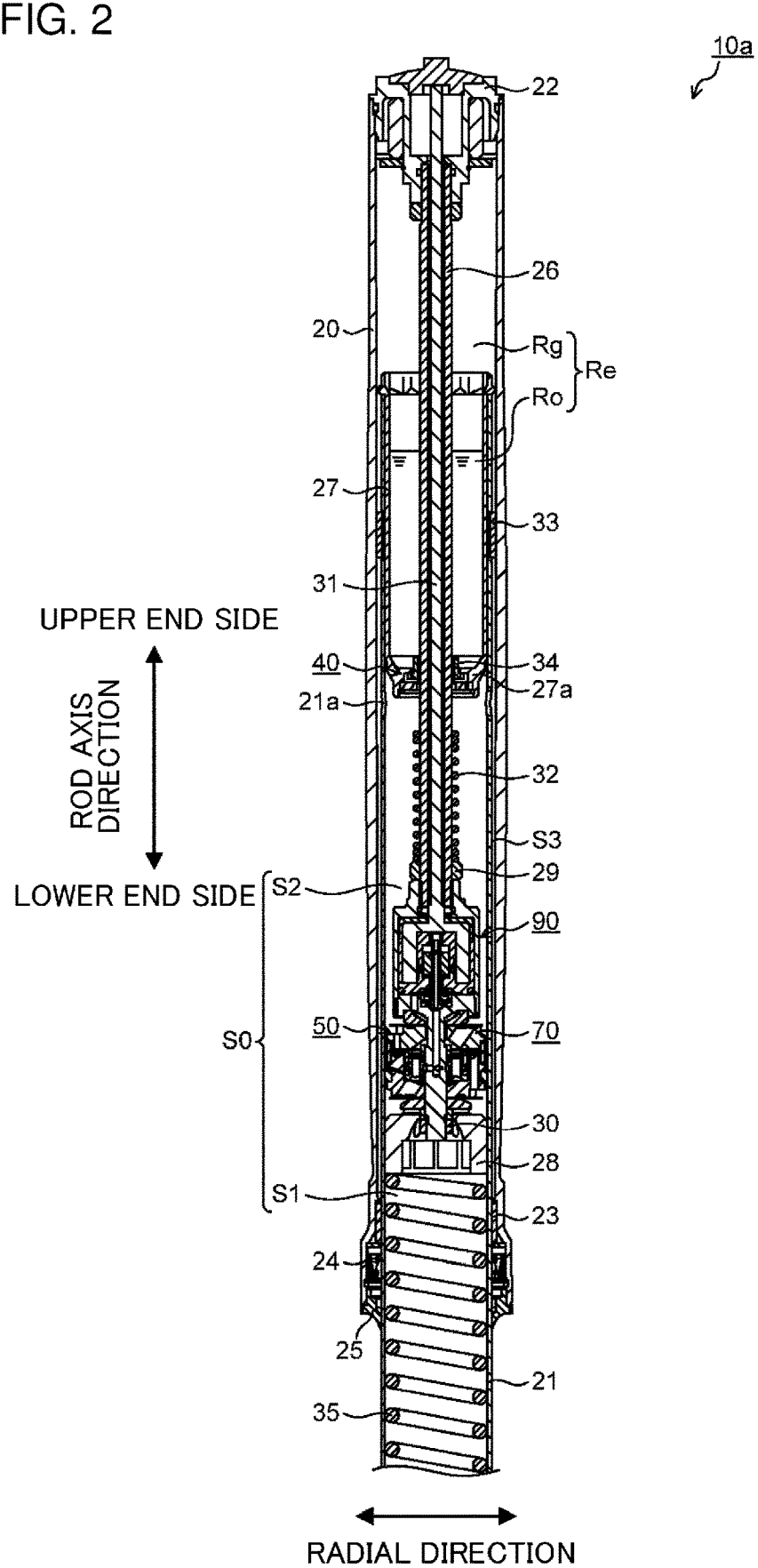
FIG. 2 is a longitudinal cross-sectional view of a first leg of a front fork which is the damping force variable shock absorber according to the first embodiment.

FIG. 2 is a drawing illustrating a longitudinal cross-section of the first leg 10a of the front fork 10 which is the damping force variable shock absorber according to the first embodiment. As illustrated in FIG. 2, the first leg 10a has such a configuration that a portion of an inner tube 21 provided on a lower end side thereof is inserted from below into an outer tube 20 provided on an upper end side thereof.

The upper end side is a vehicle body side and the lower end side is an axle side. The inner tube 21 functions as a cylinder.

The front fork 10 illustrated in this example is an inverted front fork in which the outer tube 20 is provided on the upper end side and the inner tube 21 is provided on the lower end side. The inner tube 21 is filled with oil, and the oil functions as fluid.

An upper end side of the outer tube 20 is attached to the vehicle body of the two-wheeled motor vehicle by an upper bracket 223 (see FIG. 1) and a lower bracket 224 (see FIG. 1). An upper end of the outer tube 20 is closed by a cap bolt 22. A guide bush 23, an oil seal 24, and a dust seal 25 that make sliding contact with an outer circumference of the inner tube 21 are fitted to an inner circumference of a lower end opening of the outer tube 20 in which the inner tube 21 is inserted. Moreover, a guide bush 33 is fitted to the outer circumference on the upper end side of the inner tube 21. Here, leakage of oil from the inner tube 21 is prevented by sealing operation of the oil seal 24. Entering of dust from the lower end opening of the outer tube 20 is prevented by sealing operation of the dust seal 25. The guide bush 23 functions as a first bush and the guide bush 33 functions as a second bush.

Moreover, the first leg 10a includes a bottomed cylindrical partition wall member 27 of which a portion is provided inside the inner tube 21. Moreover, a portion of the partition wall member 27 is fitted to an upper end of the inner tube 21. Moreover, the first leg 10a includes a piston rod 26 of which an upper end is attached to the cap bolt 22 of the outer tube 20 and which is slidably inserted into the partition wall member 27. The piston rod 26 is suspended toward the axle side from an axial center in the outer tube 20. Moreover, the piston rod 26 is inserted from above into the inner tube 21 and passes through a bottom portion 27a of the partition wall member 27.

Moreover, the first leg 10a includes a piston 70 which is provided at a lower end of the piston rod 26 so as to freely slide along an inner circumference of the inner tube 21. A solenoid 90 that constitutes an actuator of the damping force variable device 50, the piston 70, and a spring collar 28 are fixed to the lower end of the piston rod 26 by upper and lower nuts 29 and 30. Major parts of the damping force variable device 50 are incorporated into the piston 70. The piston rod 26 is hollow, and a power cord 31 for supplying electric power to the solenoid 90 is inserted into the piston rod 26. Moreover, a rebound spring 32 is wound above the nut 29 of the piston rod 26.

A lower end of the inner tube 21 is attached to a front axle of the two-wheeled motor vehicle with an axle attachment member (not illustrated) interposed. The portion of the inner tube 21 inserted into the outer tube 20 is held by the guide bush 33 fitted to the outer circumference at the upper end of the inner tube 21 and the guide bush 23 fitted to the inner circumference at the lower end of the outer tube 20 so as to be slidable in an up-down direction in relation to the outer tube 20.

An annular oil chamber S3 of which upper and lower ends are sealed by the guide bush 33 and the guide bush 23, respectively, is formed in a gap between the inner circumference of the outer tube 20 and the outer circumference of the inner tube 21. The piston rod 26 has a smaller cross-sectional area than a cross-sectional area of the annular oil chamber S3. Oil is enclosed in the annular oil chamber S3. The annular oil chamber S3 functions as an annular fluid chamber.

Moreover, the first leg 10a includes an oil storage chamber Re which is partitioned by the partition wall member 27 inside the inner tube 21 and is formed closer to the upper end side than the partition wall member 27 and an oil chamber S0 which is partitioned by the partition wall member 27 inside the inner tube 21 and is formed closer to the lower end side than the partition wall member 27. Moreover, the first leg 10a includes a rod-side oil chamber S2 which is partitioned in the piston 70 inside the oil storage chamber S0 and is formed closer to the upper end side than the piston 70 and a piston-side oil chamber S1 which is partitioned in the piston 70 inside the oil chamber S0 and is formed closer to the lower end side than the piston 70. Moreover, a communication hole 21a that allows the annular oil chamber S3 and the rod-side oil chamber S2 to communicate with each other is formed in the inner tube 21. The oil storage chamber Re functions as a fluid storage chamber, the oil chamber S0 functions as a fluid chamber, the rod-side oil chamber S2 functions as a rod-side fluid chamber, and the piston-side oil chamber S1 functions as a piston-side fluid chamber.

Moreover, a rod guide 34 through which the piston rod 26 passes is fitted to an axial center of the bottom portion 27a of the partition wall member 27 fitted to the inner circumference at the upper end of the inner tube 21. The piston rod 26 is held by the rod guide 34 so as to be slidable in the up-down direction.

The piston 70 engages with the inner circumference of the inner tube 21 so as to be slidable in the up-down direction. An inner side of the outer tube 20 and the inner tube 21 is partitioned vertically by the partition wall member 27, and a space disposed closer to the upper end side than the partition wall member 27 is an oil storage chamber Re that functions as a reservoir. The oil storage chamber Re includes an oil storage portion Ro in which oil is supplied and discharged in relation to the rod-side oil chamber S2 with the partition wall member 27 as a boundary and a gas storage portion Rg in which gas such as air is filled.

Figure 3:
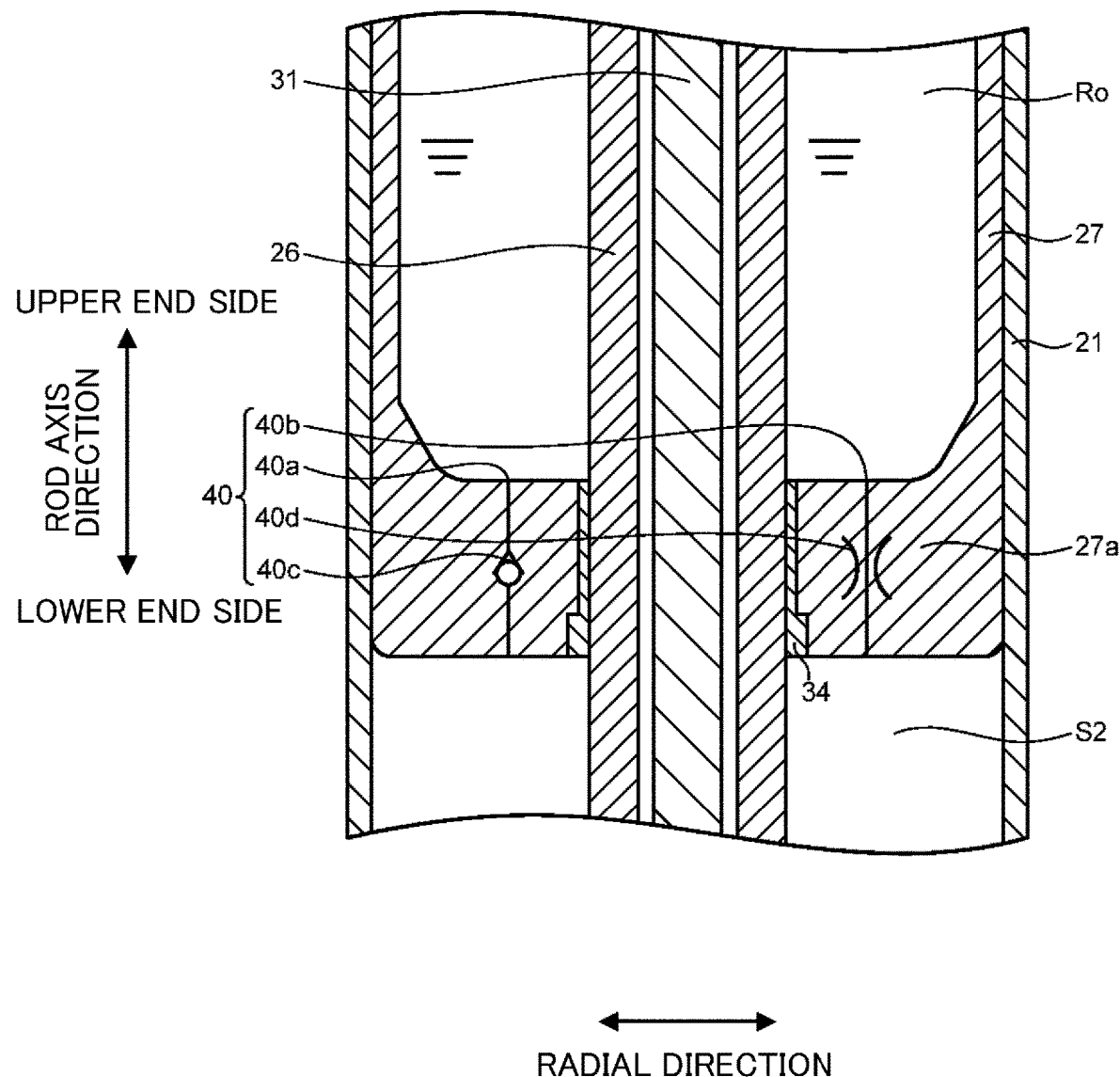
FIG. 3 is a longitudinal cross-sectional view schematically illustrating a configuration of a supply and discharge portion provided in a bottom portion of a partition wall member of the damping force variable shock absorber according to the first embodiment.

Here, a supply and discharge portion 40 that enables oil to be supplied and discharged between the oil storage portion Ro and the rod-side oil chamber S2 under the partition wall member 27 is provided in the bottom portion 27a of the bottomed cylindrical partition wall member 27. FIG. 3 is a cross-sectional view schematically illustrating a configuration of the supply and discharge portion 40 provided in the bottom portion 27a of the partition wall member 27. As illustrated in FIG. 3, the supply and discharge portion 40 includes an oil passage 40a, an oil passage 40b, a check valve 40c, and a throttle 40d.

The oil passages 40a and 40b allow the oil storage portion Ro of the oil storage chamber Re and the rod-side oil chamber S2 to communicate with each other. The check valve 40c is provided in the oil passage 40a. The check valve 40c allows flow of the oil from the oil storage portion Ro to the rod-side oil chamber S2 and blocks the flow of the oil from the rod-side oil chamber S2 to the oil storage portion Ro. The throttle 40d is provided in the oil passage 40b. The throttle 40d limits the flow of the oil between the oil storage portion Ro and the rod-side oil chamber S2.

A suspension spring 35 is disposed between the spring collar 28 and the bottom portion (not illustrated) in the inner tube 21.

Next, a configuration of the damping force variable device 50 will be described with reference to FIG. 4.

Figure 4:
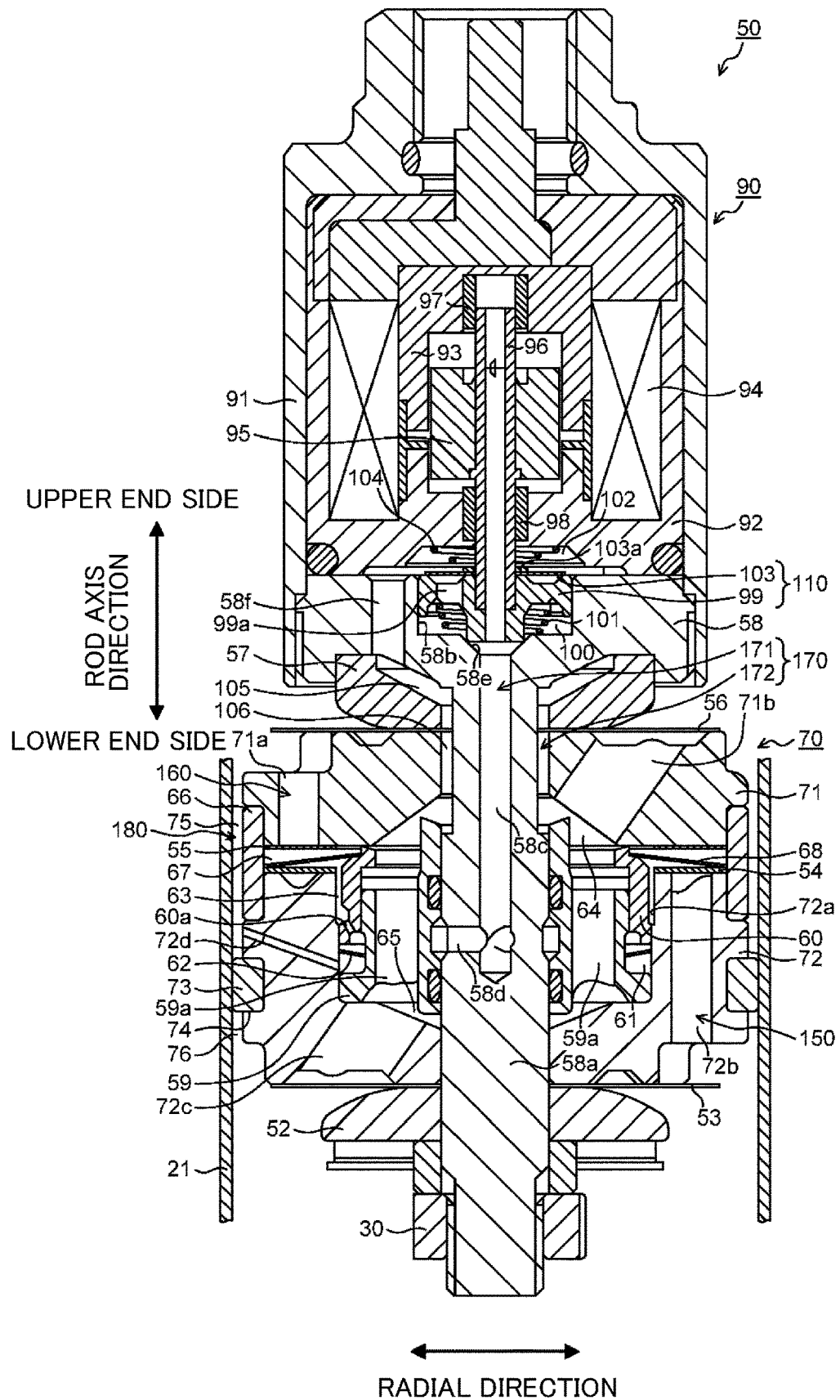
FIG. 4 is a longitudinal cross-sectional view of a damping force variable device of a first leg of a front fork which is the damping force variable shock absorber according to the first embodiment.

FIG. 4 is a drawing illustrating a longitudinal cross-section of the damping force variable device 50 of the first leg 10a of the front fork 10 which is the damping force variable shock absorber according to the first embodiment. FIG. 4 illustrates a portion of the inner tube 21 for the sake of convenience.

The major parts of the damping force variable device 50 are incorporated into the piston 70. The piston 70 is divided into two parts, an upper piston member 71 and a lower piston member 72. Although an example in which the major parts of the damping force variable device 50 are incorporated into the piston 70 has been illustrated, the damping force variable device 50 is not limited to this, and the major parts thereof may not be incorporated into the piston 70 but the damping force variable device 50 may be provided separately.

The damping force variable device 50 is formed by assembling a valve stopper 52, an extension-side outlet check valve 53, the lower piston member 72, a compression-side inlet check valve 54, an extension-side inlet check valve 55, the upper piston member 71, a compression-side outlet check valve 56, a valve stopper 57, a valve seat member 58, and the solenoid 90 sequentially in a rod axis direction from the lower side.

A rod portion 58a protrudes integrally from the axial center of the valve seat member 58 toward the lower side. The rod portion 58a passes through a center in a radial direction of the valve stopper 57, the compression-side outlet check valve 56, the upper piston member 71, the extension-side inlet check valve 55, the compression-side inlet check valve 54, the lower piston member 72, the extension-side outlet check valve 53, and the valve stopper 52. The nut 30 is screwed on a lower end of the rod portion 58a.

A main valve member 59 fitted to an outer circumference of the rod portion 58a of the valve seat member 58 is accommodated in a concave portion 72a of the lower piston member 72. An approximately cylindrical main valve 60 is fitted and held on an outer circumference of the main valve member 59 so as to be slidable in the up-down direction. An annular pilot chamber 61 partitioned by the main valve member 59 is formed in a portion of the concave portion 72a on a back surface side (the lower end side in FIG. 4) of the main valve 60. The pilot chamber 61 introduces a portion of the flow of the oil therein and applies internal pressure to the main valve 60 in a valve-closing direction (toward the upper end side). A plate spring 62 biases the main valve 60 in an upward direction (toward the valve-closing side) so that the main valve 60 sits on a lower surface (a sitting surface) of the upper piston member 71 is accommodated in the pilot chamber 61.

A passage 63 is formed in the concave portion 72a of the lower piston member 72 between an inner circumference of the concave portion 72a and the outer circumference of the main valve 60. The passage 63 communicates with the pilot chamber 61 through an oil hole 60a formed in the main valve 60.

A space 64 is formed in an inner circumference of a lower portion of the upper piston member 71. Moreover, an oil hole 71a that passes in the up-down direction and an oblique oil hole 71b are formed in the upper piston member 71. Here, the oil hole 71a is normally open to the rod-side oil chamber S2 (see FIG. 2) in the inner tube 21 and is selectively opened and closed by the extension-side inlet check valve 55. Moreover, the oil hole 71b is normally open to the space 64 and is selectively opened and closed by the compression-side outlet check valve 56.

A space 65 is formed in an inner circumference of a lower portion of the lower piston member 72. Moreover, an oil hole 72b that passes in the up-down direction and an oblique oil hole 72c are formed in the lower piston member 72. Here, the oil hole 72b is normally open to the piston-side oil chamber S1 (see FIG. 2) formed in the inner tube 21 and is selectively opened and closed by the compression-side inlet check valve 54. Moreover, the oil hole 72c is normally open to the space 65 and is selectively opened and closed by the extension-side outlet check valve 53.

Further, a communication passage 72d that allows the pilot chamber 61 and the rod-side oil chamber S2 to communicate with each other is formed in the lower piston member 72. As illustrated in FIG. 4, the communication passage 72d is formed as a communication hole that allows the pilot chamber 61 and the rod-side oil chamber S2 to communicate with each other, for example. One end of the communication passage 72d is open to a side surface of the lower piston member 72 between a distance collar 66 described later and a sliding sealing member 73 provided below the distance collar 66.

The communication passage 72d is not limited to a configuration in which the communication passage 72d allows the pilot chamber 61 and the rod-side oil chamber S2 to communicate with each other. The communication passage 72d may allow a passage between the pilot chamber 61 and a pilot valve 110 described later to communicate with the rod-side oil chamber S2.

The passage between the pilot chamber 61 and the pilot valve 110 corresponds to a portion of an upstream-side pilot passage 171 but does not include the pilot chamber 61 and the oil hole 60a of the main valve 60 which constitute a part of the upstream-side pilot passage 171. In a normal state, the passage between the pilot chamber 61 and the pilot valve 110 is a passage between the pilot chamber 61 and a pilot valve body 99. Specifically, the passage between the pilot chamber 61 and the pilot valve 110 is a passage which includes an oil hole (not illustrated) that is formed in the main valve member 59 and communicates with the pilot chamber 61, an oil hole 58d, and an oil hole 58c.

Besides, in case of failure in which supply of current to the solenoid 90 is interrupted and the solenoid 90 does not generate thrust, the passage between the pilot chamber 61 and the pilot valve 110 is a passage between the pilot chamber 61 and a fail-safe valve 103 described later. Specifically, the passage includes an oil hole (not illustrated) that is formed in the main valve member 59 and communicates with the pilot chamber 61, the oil hole 58d, the oil hole 58c, a space 100, and an oil hole 99a.

A portion of the sliding sealing member 73 is fitted to a groove 74 formed in a side surface of the lower piston member 72. An outer circumferential surface of the sliding sealing member 73 protrudes toward an outer circumferential side (an outer side in the radial direction) further than an outer circumferential surface of the lower piston member 72 and is in contact with an inner circumferential surface of the inner tube 21 so as to be slidable.

A gap 75 is formed between the inner tube 21 and the piston 70 on a side closer to the upper end side than the sliding sealing member 73. This gap 75 communicates with the rod-side oil chamber S2 (see FIG. 2). Moreover, a gap 76 is formed between the inner tube 21 and the piston 70 on a side closer to the lower end side than the sliding sealing member 73. This gap 76 communicates with the piston-side oil chamber S1 (see FIG. 2). The space in the inner tube 21 on the lower end side of the partition wall member 27 is partitioned into the rod-side oil chamber S2 and the piston-side oil chamber S1 by the sliding sealing member 73 that forms a portion of the piston 70.

One end of the communication passage 72d is open to the gap 75. At least one communication passage 72d may be provided. For example, a plurality of communication passages 72d may be formed in a circumferential direction of the lower piston member 72. By changing the hold diameter and the number of holes in the communication passage 72d, it is possible to arbitrarily change the decrease in the pressure of the pilot chamber 61 and the passage between the pilot chamber 61 and the pilot valve 110.

A concave portion 58b of which an upper side is open is formed in an upper portion of the axial center of the valve seat member 58. An oil hole 58c is formed so as to extend from the concave portion 58b toward the lower side along the axial center of the rod portion 58a. An oil hole 58d is formed so as to extend from the lower end of the oil hole 58c toward an outer side in the radial direction at a right angle. The oil hole 58d communicates with the pilot chamber 61 through an oil hole (not illustrated) formed in the main valve member 59 in the radial direction.

A plurality of oil holes 59a that passes in the axial direction is formed in the main valve member 59. Upper ends of the oil holes 59a communicate with the oil hole 71b of the upper piston member 71 through the space 64 of the upper piston member 71, and lower ends of the oil holes 59a communicate with the oil hole 72c of the lower piston member 72 through the space 65 of the lower piston member 72.

A gap 67 extending in the rod axis direction is formed between the upper piston member 71 and the lower piston member 72 by a ring-shaped distance collar 66 fitted to the outer circumferences of the upper piston member 71 and the lower piston member 72. The compression-side inlet check valve 54 and the extension-side inlet check valve 55 are provided in the gap 67. The compression-side inlet check valve 54 and the extension-side inlet check valve 55 are biased by a plate spring 68 interposed between the valves 54 and 55, in a direction in which the oil hole 72b of the lower piston member 72 and the oil hole 71a of the upper piston member 71 are closed, respectively.

Next, a configuration of the solenoid 90 will be described.

The solenoid 90 has a cylindrical case 91 of which the inner circumference of the lower end opening engages with the outer circumference of the valve seat member 58. Two bottomed cylindrical cores 92 and 93, an annular coil 94, a plunger 95 accommodated in the cores 92 and 93, a hollow operating rod 96 that passes through an axial center of the plunger 95, and the like are accommodated in the case 91. The operating rod 96 has both ends in the up-down direction being supported by the cylindrical guide bushes 97 and 98 so as to be movable in the up-down direction. A pilot valve 110 that includes the pilot valve body 99 and the fail-safe valve 103 is provided in an outer circumference of a lower end of the operating rod 96 that faces an inside of the concave portion 58b of the valve seat member 58. Thus, the damping force variable device 50 includes the solenoid 90 which is an actuator that generates thrust in the valve-closing direction (toward the lower end side) with respect to the pilot valve 110.

The pilot valve body 99 is fitted to the inner circumference of the concave portion 58b of the valve seat member 58 so as to be movable in the up-down direction. The pilot valve body 99 opens and closes the oil hole 58c by selectively sitting on a tapered valve seat 58e formed on an upper end of the oil hole 58c that is formed at the axial center of the valve seat member 58. In addition to generating the damping force with the aid of the main valve 60, the damping force may be generated by the pilot valve 110 that includes the pilot valve body 99 and the fail-safe valve 103.

Here, a space 100 partitioned by the pilot valve body 99 is formed in the concave portion 58b of the valve seat member 58. Moreover, a spring 101 that biases the pilot valve body 99 in the valve-opening direction (toward the upper end side in FIG. 4) is accommodated in the space 100.

Here, the space 100 formed in the valve seat member 58 communicates with the pilot chamber 61 through the oil holes 58c and 58d of the valve seat member 58 and an oil hole (not illustrated) formed in the main valve member 59. Moreover, an oil hole 99a is formed in the pilot valve body 99. The oil hole 99a is normally open to the space 100.

A recessed space 102 is formed between the valve seat member 58 and an end surface of the core 92 of the solenoid 90. The fail-safe valve 103 that selectively opens and closes the oil hole 99a of the pilot valve body 99 is provided in the space 102. The fail-safe valve 103 is held on an outer circumference of the operating rod 96 so as to be movable in the rod axis direction and is biased in the valve-closing direction (toward the lower end side in FIG. 4) by the spring 104 accommodated in the space 102. A spring constant of the spring 104 is set to be smaller than a spring constant of the spring 101 that biases the pilot valve body 99 in the valve-opening direction.

An oil hole 58f is formed in the valve seat member 58 so as to pass in the up-down direction. The space 102 communicates with the space 64 of the upper piston member 71 through the oil hole 58f, a cylindrical passage 105 formed between the valve stopper 57 and the valve seat member 58, and a cylindrical passage 106 formed between the upper piston member 71 and the rod portion 58a of the valve seat member 58.

In the damping force variable device 50 having such a configuration, the oil hole 72b of the lower piston member 72, the gap 67, the space 64 of the upper piston member 71, and the oil hole 71b of the upper piston member 71 form the main passage 150 during a compression-side stroke. The compression-side inlet check valve 54, the main valve 60, and the compression-side outlet check valve 56 are provided in the main passage 150.

Moreover, the oil hole 71a of the upper piston member 71, the gap 67, the oil holes 59a of the main valve member 59, the space 65 of the lower piston member 72, and the oil hole 72c of the lower piston member 72 form the main passage 160 during an extension-side stroke. The extension-side inlet check valve 55, the main valve 60, and the extension-side outlet check valve 53 are provided in the main passage 160.

The oil hole 60a of the main valve 60, the pilot chamber 61, the oil hole (not illustrated) formed in the main valve member 59, the oil holes 58d and 58c formed in the valve seat member 58, the space 100 formed by the pilot valve body 99 and the valve seat member 58, the oil hole 99a formed in the pilot valve body 99, the space 102 formed in the core 92 of the solenoid 90, the oil hole 58f formed in the valve seat member 58, the passage 105 formed between the valve stopper 57 and the valve seat member 58, the passage 106 connected to the passage 105, and the space 64 of the upper piston member 71 form the pilot passage 170 during the compression-side stroke and the extension-side stroke.

Here, the pilot passage 170 can be divided into an upstream-side pilot passage 171 and a downstream-side pilot passage 172, for example. In the normal state, the upstream-side pilot passage 171 includes the oil hole 60a of the main valve 60, the pilot chamber 61, the oil hole (not illustrated) formed in the main valve member 59 to communicate with the pilot chamber 61, the oil hole 58d, and the oil hole 58c, for example. The downstream-side pilot passage 172 includes the space 100 formed by the pilot valve body 99 and the valve seat member 58, the oil hole 99a formed in the pilot valve body 99, the space 102 formed in the core 92 of the solenoid 90, the oil hole 58*f* formed in the valve seat member 58, the passage 105 formed between the valve stopper 57 and the valve seat member 58, the passage 106 connected to the passage 105, and the space 64 of the upper piston member 71.

In case of the failure described later, the upstream-side pilot passage 171 includes the oil hole 60*a* of the main valve 60, the pilot chamber 61, the oil hole (not illustrated) formed in the main valve member 59 to communicate with the pilot chamber 61, the oil hole 58*d*, the oil hole 58*c*, the space 100 formed by the pilot valve body 99 and the valve seat member 58, and the oil hole 99*a* formed in the pilot valve body 99. Moreover, in case of the failure, the downstream-side pilot passage 172 includes the space 102 formed in the core 92 of the solenoid 90, the oil hole 58*f* formed in the valve seat member 58, the passage 105 formed between the valve stopper 57 and the valve seat member 58, the passage 106 connected to the passage 105, and the space 64 of the upper piston member 71, for example.

The pilot valve 110 including the pilot valve body 99 and the fail-safe valve 103 is provided in the pilot passage 170. In the normal state, an internal pressure of the pilot chamber 61 and the passage between the pilot chamber 61 and the pilot valve 110 is adjusted by opening and closing of the pilot valve body 99 in relation to the valve seat member 58. In case of the failure, the internal pressure of the pilot chamber 61 and the passage between the pilot chamber 61 and the pilot valve 110 is adjusted by opening and closing of the fail-safe valve 103 in relation to the pilot valve body 99. In any case, the internal pressure of the pilot chamber 61 and the passage between the pilot chamber 61 and the pilot valve 110 is adjusted by opening and closing of the pilot valve 110.

Moreover, the communication passage 72*d* that allows the pilot chamber 61 and the rod-side oil chamber S2 to communicate with each other guides a portion of the oil in the pilot chamber 61 toward the rod-side oil chamber S2 during the compression-side stroke. That is, when the communication passage 72*d* is provided, increase in the pressure in the pilot chamber 61 is suppressed as compared to when the communication passage 72*d* is not provided.

On the other hand, during the extension-side stroke, a portion of the oil inside the rod-side oil chamber S2 flows from the rod-side oil chamber S2 into the pilot chamber 61 through the communication passage 72*d*.

(Operation of Front Fork 10)

Figure 5:
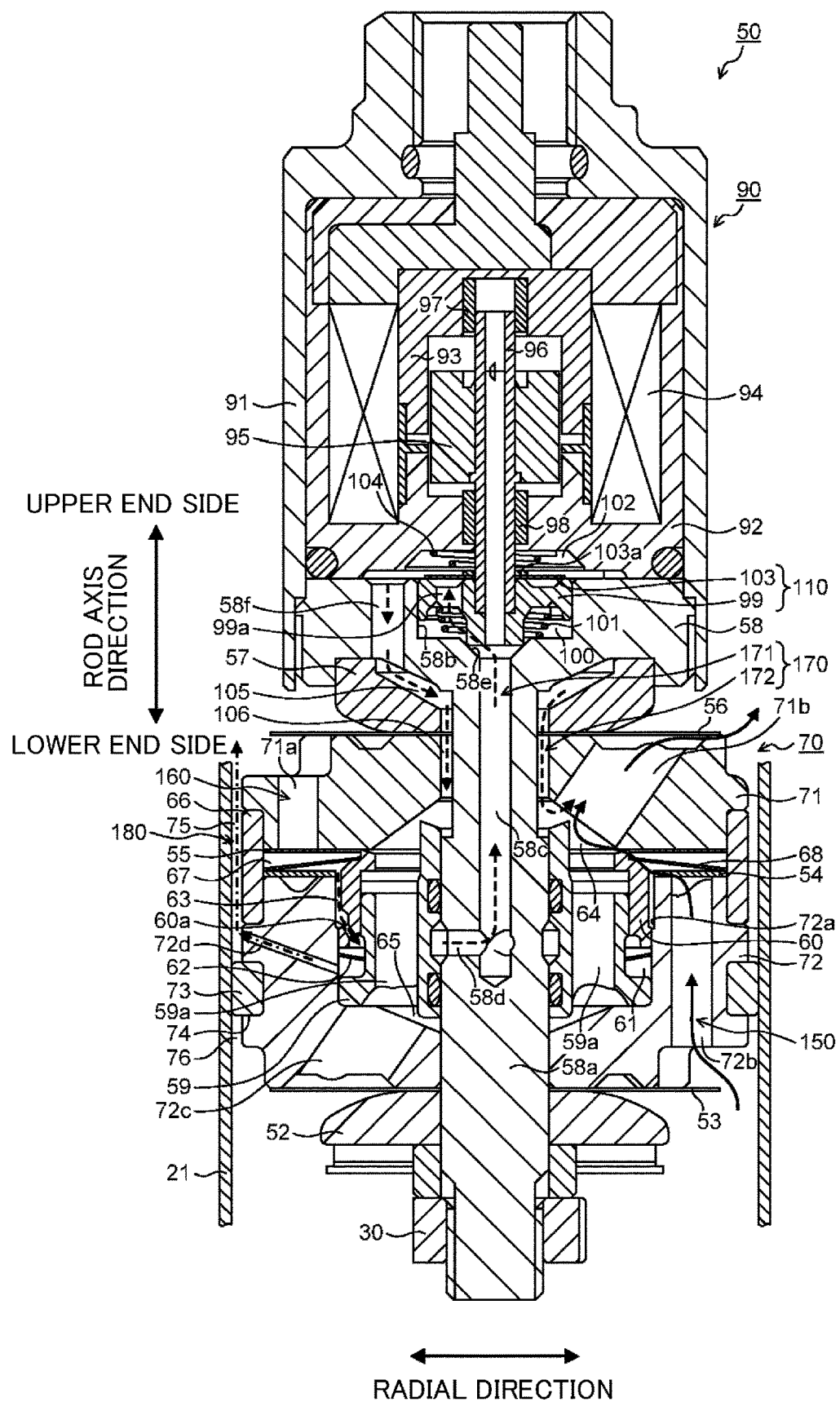
FIG. 5 is a longitudinal cross-sectional view illustrating flow of oil during a compression-side stroke of the damping force variable device of the first leg of the front fork which is the damping force variable shock absorber according to the first embodiment.
Figure 6:
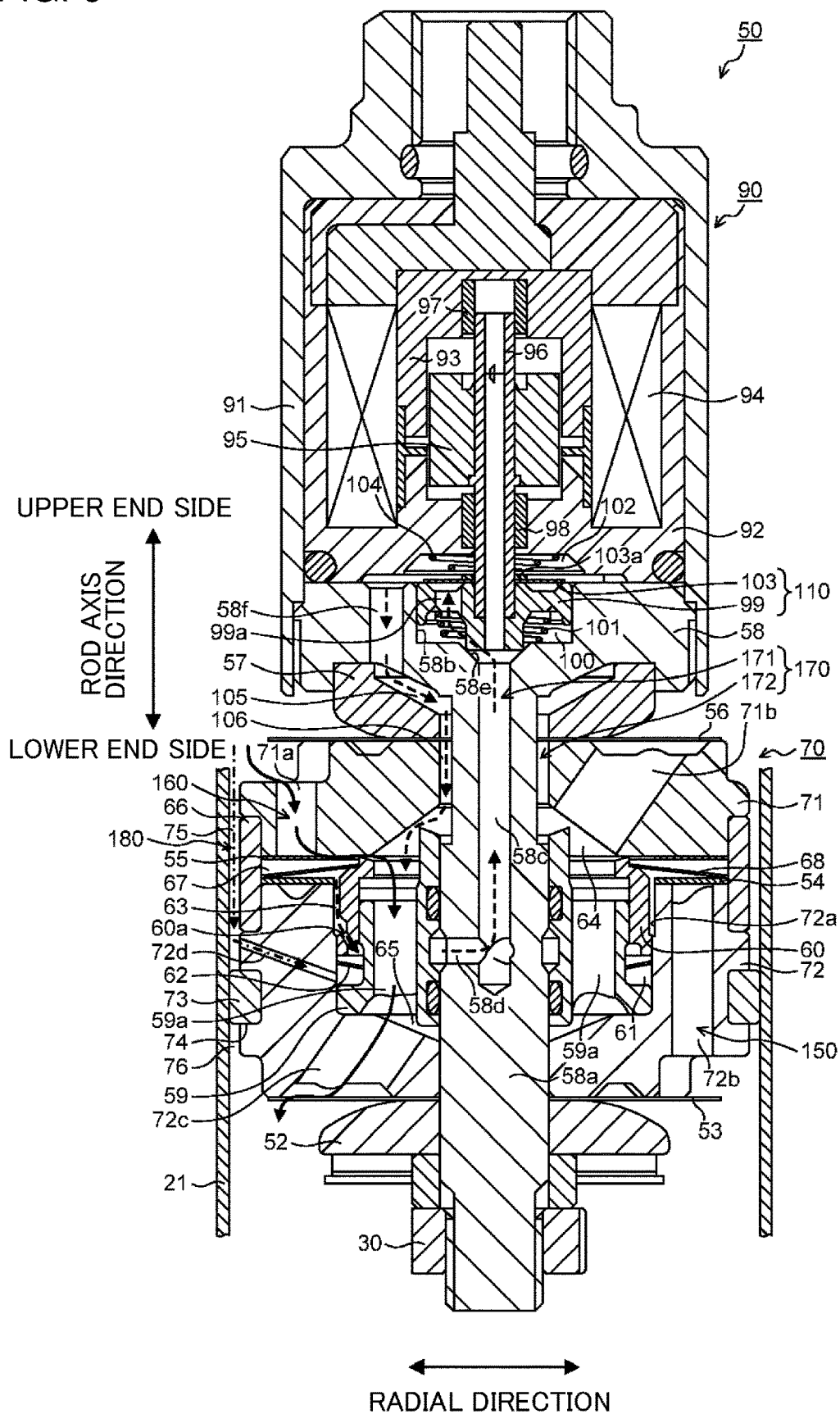
FIG. 6 is a longitudinal cross-sectional view illustrating the flow of the oil during an extension-side stroke of the damping force variable device of the first leg of the front fork which is the damping force variable shock absorber according to the first embodiment.

Next, operation during the compression-side stroke and the extension-side stroke of the first leg 10*a* having such a configuration will be described with reference to FIGS. 5 and 6. FIG. 5 is a longitudinal cross-sectional view illustrating the flow of the oil during the compression-side stroke of the damping force variable device 50 of the first leg 10*a* of the front fork 10 which is the damping force variable shock absorber according to the first embodiment. FIG. 6 is a longitudinal cross-sectional view illustrating the flow of the oil during extension-side stroke of the damping force variable device 50 of the first leg 10*a* of the front fork 10 which is the damping force variable shock absorber according to the first embodiment. FIGS. 5 and 6 illustrate a portion of the inner tube 21 for the sake of convenience.

(Compression-Side Stroke)

First, the operation during the compression-side stroke will be described with reference to FIG. 5.

When the front wheel 213 of a two-wheeled motor vehicle 200 moves upward and downward following unevenness on a road surface during riding the two-wheeled motor vehicle 200, the outer tube 20 and the inner tube 21 that suspend the front wheel do telescopic motion. In compression-side stroke in which the inner tube 21 moves upward in relation to the outer tube 20, the oil in the piston-side oil chamber S1 is compressed by the piston 70 and pressure therein increases.

Moreover, the oil in the piston-side oil chamber S1 flows into the rod-side oil chamber S2 through the main passage 150 during compression-side stroke.

Specifically, as indicated by solid-line arrows in FIG. 5, the oil flows from the piston-side oil chamber S1 to pass through the oil hole 72*b* of the lower piston member 72 to push and open the compression-side inlet check valve 54 while resisting biasing force of the plate spring 68 to flow into the gap 67. Moreover, the oil flowing into the gap 67 pushes and opens the main valve 60 with pressure thereof while resisting force in the valve-closing direction (toward the upper end side) of back pressure of the plate spring 68 and the pilot chamber 61. Moreover, the oil passes from the gap 67 through the oil hole 71*b* of the upper piston member 71 via the space 64 to push and open the compression-side outlet check valve 56 to flow into the rod-side oil chamber S2. In this case, with flow resistance of the oil when passing through the main valve 60, a compression-side damping force is generated in the first leg 10*a*.

On the other hand, a portion of the oil flowing from the piston-side oil chamber S1 into the gap 67 through the oil hole 72*b* of the lower piston member 72 joins the oil flowing in the main passage 150 through the pilot passage 170. Moreover, a portion of the oil flowing through the pilot passage 170 flows from the pilot chamber 61 into the rod-side oil chamber S2 through the communication passage 72*d*.

Specifically, as indicated by broken-line arrows in FIG. 5, a portion of the oil flowing from the piston-side oil chamber S1 toward the gap 67 through the oil hole 72*b* of the lower piston member 72 passes through the oil hole 60*a* of the main valve 60 from the passage 63 on the outer circumference of the main valve 60 to flow into the pilot chamber 61.

As indicated by the broken-line arrows in FIG. 5, a portion of the oil flowing into the pilot chamber 61 flows from the pilot chamber 61 into the space 100 of the valve seat member 58 through the oil hole (not illustrated) of the main valve member 59, the oil holes 58*d* and 58*c* of the valve seat member 58, and the gap between the pilot valve body 99 and the valve seat 58*e*. Moreover, the oil flowing into the space 100 of the valve seat member 58 passes through the oil hole 99*a* of the pilot valve body 99 to push and open the fail-safe valve 103 to flow into the space 102 of the core 92.

Here, the fail-safe valve 103 may be designed so as to be opened by being spaced from the pilot valve body 99 immediately when oil flows due to a function of the check valve only by setting biasing force of the spring 104 low. Alternatively, a flow resistance may occur between the fail-safe valve 103 and the pilot valve body 99 when the fail-safe valve 103 is opened by being spaced from the pilot valve body 99 while resisting the biasing force of the spring 104 by setting the biasing force of the spring 104 to a certain value.

The oil flowing into the space 102 passes through the oil hole 58*f* of the valve seat member 58 and the passages 105 and 106 to flow into the space 64 of the upper piston member 71 to join the oil flowing through the main passage 150. The joined oil flows into the rod-side oil chamber S2.

On the other hand, as indicated by a one-dot-chain-line arrow in FIG. 5, a remaining portion of the oil flowing into the pilot chamber 61 flows into the gap 75 between the inner tube 21 and the piston 70 through the communication passage 72*d*. Since the gap 75 communicates with the rod-side oil chamber S2, the remaining portion of the oil flowing into the pilot chamber 61 flows into the rod-side oil chamber S2. In this connection, a passage including the communication passage 72*d* and the gap 75 is referred to as a bypass passage 180.

As a result, the internal pressure (the back pressure) of the pilot chamber 61 during compression-side stroke decreases, and thus force that presses the main valve 60 in the valve-closing direction (toward the upper end side) decreases. When the communication passage 72*d* is provided, the damping force during compression-side stroke is low as compared to when the communication passage 72*d* is not provided. Thus, it is possible to adjust the damping force to be relatively low as an initial setting during compression-side stroke.

Here, an opening degree of the main valve 60 that generates a main damping force in the damping force variable device 50 of the first leg 10*a* of the front fork 10 is influenced by the internal pressure (the back pressure) of the pilot chamber 61. Thus, the internal pressure of the pilot chamber 61 may be adjusted by methods other than the method of allowing the oil flowing into the pilot chamber 61 to flow into the rod-side oil chamber S2 with the aid of the communication passage 72*d*.

By driving the solenoid 90 to move the operating rod 96 and the pilot valve body 99 provided on an outer circumference at the lower end of the operating rod 96 in the rod axis direction to change the opening degree of the pilot valve body 99 in relation to the valve seat member 58, it is possible to adjust the flow resistance of the oil passing through the gap between the pilot valve body 99 and the valve seat member 58 and thereby to adjust the internal pressure of the pilot chamber 61 and the passage between the pilot chamber 61 and the pilot valve 110. That is, the solenoid 90 and the pilot valve body 99 control the internal pressure of the pilot chamber 61 and the passage between the pilot chamber 61 and the pilot valve 110.

In this manner, by adjusting the back pressure of the pilot chamber 61 with the aid of the solenoid 90 and thereby adjusting the opening of the main valve 60, it is possible to adjust the damping force generated by the flow resistance of the oil passing through the main valve 60. Specifically, when the opening degree of the pilot valve body 99 in relation to the valve seat member 58 is decreased, the back pressure of the pilot chamber 61 increases, the opening degree of the main valve 60 decreases, and thus the damping force increases. On the other hand, when the opening degree of the pilot valve body 99 in relation to the valve seat member 58 is increased, the back pressure of the pilot chamber 61 decreases, the opening degree of the main valve 60 increases, and thus the damping force decreases.

Moreover, by incorporating the spring 101 into a biasing means that biases the pilot valve body 99 in the valve-opening direction, it is possible to freely set the valve-opening pressure of the pilot valve body 99 by adjusting a spring constant of the spring 101. Further, when the biasing means includes oil pressure, it is possible to continuously change the valve-opening pressure of the pilot valve body 99. In the present embodiment, since the biasing means includes the spring 101 and the oil pressure, it is possible to continuously change the valve-opening pressure of the pilot valve body 99 and to broaden the setting width.

Here, in the compression-side stroke, an amount of the oil corresponding to a volume of the piston rod 26 advancing into the inner tube 21 is delivered from the rod-side oil chamber S2 in the inner tube 21 to the annular oil chamber S3 illustrated in FIG. 2 through the communication hole 21*a*. In this case, since an increase in volume ΔV1 (supply amount) of the annular oil chamber S3 is larger than an increase in volume ΔV2 of the piston rod 26, a deficit "ΔV1−ΔV2" in a supply amount of the oil supplied to the annular oil chamber S3 is supplied from the oil storage portion Ro to the rod-side oil chamber S2. Supply of a deficit amount of the oil is performed by the supply and discharge portion 40 illustrated in FIG. 3, which is formed in the bottom portion of the partition wall member 27 so as to enable oil to be supplied and discharged between the oil storage portion Ro and the rod-side oil chamber S2.

(Extension-Side Stroke)

Next, the operation during extension-side stroke will be described with reference to FIG. 6.

In the extension-side stroke in which the inner tube 21 moves downward in relation to the outer tube 20, the oil in the rod-side oil chamber S2 is compressed by the piston 70 and the pressure thereof increases.

Then, the oil in the rod-side oil chamber S2 flows into the piston-side oil chamber S1 through the main passage 160 during the extension-side stroke.

Specifically, as indicated by solid-line arrows in FIG. 6, the oil flows from the rod-side oil chamber S2 to pass through the oil hole 71*a* of the upper piston member 71 to push and open the extension-side inlet check valve 55 while resisting the biasing force of the plate spring 68 to flow into the gap 67. Moreover, the oil flowing into the gap 67 pushes and opens the main valve 60 with the pressure thereof while resisting the force in the valve-closing direction of the plate spring 68 and the back pressure of the pilot chamber 61 to flow from the gap 67 through the oil holes 59*a* of the main valve member 59 and the oil hole 72*c* of the lower piston member 72 to push and open the extension-side outlet check valve 53 to flow into the piston-side oil chamber S1. In this case, with the flow resistance of the oil when passing through the main valve 60, an extension-side damping force is generated in the damping force variable device 50.

On the other hand, a portion of the oil flowing from the rod-side oil chamber S2 into the gap 67 through the oil hole 71*a* of the upper piston member 71 passes through the pilot passage 170 including the pilot chamber 61 similarly to the case of the compression-side stroke. A operation method and a function of the pilot valve body 99 and the fail-safe valve 103 in relation to the flow of the oil in the pilot passage 170 in the extension-side stroke are the same as those of the compression-side stroke. The oil flowing through the pilot passage 170 joins the oil flowing through the main passage 160. Here, the flow of the oil in the pilot passage 170 is depicted by broken-line arrows in FIG. 6. The joined oil flows into the piston-side oil chamber S1.

Moreover, a portion of the oil in the rod-side oil chamber S2 flow from the rod-side oil chamber S2 into the pilot chamber 61 through the communication passage 72*d*. That is, the flow of the oil in the rod-side oil chamber S2 branches into two passages, the oil flowing along the main passage 160 indicated by the solid-line arrows in FIG. 6 and the oil flowing along the bypass passage 180 indicated by a one-dot-chain-line arrow in FIG. 6, near the compression-side outlet check valve 56*a*.

The oil flowing through the bypass passage 180 flows into the communication passage 72*d* through the gap 75 between the piston 70 and the inner tube 21 to flow into the pilot chamber 61.

Here, pressure of the oil flowing into the pilot chamber 61 through the main passage 160 is reduced by flow resistance of a gap between the extension-side inlet check valve 55 and the upper piston member 71 and flow resistance of the oil hole 60a in relation to internal pressure of the rod-side oil chamber S2. On the other hand, pressure of the oil flowing into the pilot chamber 61 through the bypass passage 180 is reduced by flow resistance of the communication passage 72d in relation to the internal pressure of the rod-side oil chamber S2. Thus, in the first leg 10a, by controlling the sum of the flow resistance of the gap between the extension-side inlet check valve 55 and the upper piston member 71 and the flow resistance of the oil hole 60a to be equal to the flow resistance of the communication passage 72d, an increase in the internal pressure of the pilot chamber 61 due to the oil flowing into the pilot chamber 61 through the bypass passage 180 can be suppressed.

Here, the opening degree of the main valve 60 that generates the main damping force in the damping force variable device 50 of the first leg 10a of the front fork 10 is influenced by the internal pressure (the back pressure) of the pilot chamber 61 similarly to the compression-side stroke.

By driving the solenoid 90 to move the operating rod 96 and the pilot valve body 99 provided on the outer circumference at the lower end of the operating rod 96 in the rod axis direction to change the opening degree of the pilot valve body 99 in relation to the valve seat member 58, it is possible to adjust the flow resistance of the oil passing through the gap between the pilot valve body 99 and the valve seat member 58 and thereby to adjust the internal pressure of the pilot chamber 61 and the passage between the pilot chamber 61 and the pilot valve 110. That is, the solenoid 90 and the pilot valve body 99 control the internal pressure of the pilot chamber 61 and the passage between the pilot chamber 61 and the pilot valve 110.

In this manner, by adjusting the back pressure of the pilot chamber 61 with the aid of the solenoid 90 and thereby adjusting the opening of the main valve 60, it is possible to adjust the damping force generated by the flow resistance of the oil passing through the main valve 60. Specifically, when the opening degree of the pilot valve body 99 in relation to the valve seat member 58 is decreased, the back pressure of the pilot chamber 61 increases, the opening degree of the main valve 60 decreases, and thus the damping force increases. On the other hand, when the opening degree of the pilot valve body 99 in relation to the valve seat member 58 is increased, the back pressure of the pilot chamber 61 decreases, the opening degree of the main valve 60 increases, and thus the damping force decreases.

Moreover, by incorporating the spring 101 into the biasing means that biases the pilot valve body 99 in the valve-opening direction, it is possible to freely set the valve-opening pressure of the pilot valve body 99 by adjusting the spring constant of the spring 101. Further, when the biasing means includes oil pressure, it is possible to continuously change the valve-opening pressure of the pilot valve body 99. In the present embodiment, since the biasing means includes the spring 101 and the oil pressure, it is possible to continuously change the valve-opening pressure of the pilot valve body 99 and to broaden the setting width.

Here, in the extension-side stroke, an amount of oil corresponding to the volume of the piston rod 26 exiting from the inner tube 21 is delivered from the annular oil chamber S3 illustrated in FIG. 2 to the rod-side oil chamber S2 through the communication hole 21a. In this case, since a decrease in volume ΔV3 (discharge amount) of the annular oil chamber S3 is larger than a decrease in volume ΔV4 of the piston rod 26, a surplus "ΔV3−ΔV4" out of the discharge amount of oil discharged from the annular oil chamber S3 is discharged from the rod-side oil chamber S2 to the oil storage portion Ro. Discharge of a surplus amount of the oil is performed by the supply and discharge portion 40 illustrated in FIG. 3, which is formed in the bottom portion of the partition wall member 27 so as to enable the oil to be supplied and discharged between the oil storage portion Ro and the rod-side oil chamber S2.

(In Case of Failure)

Figure 7:
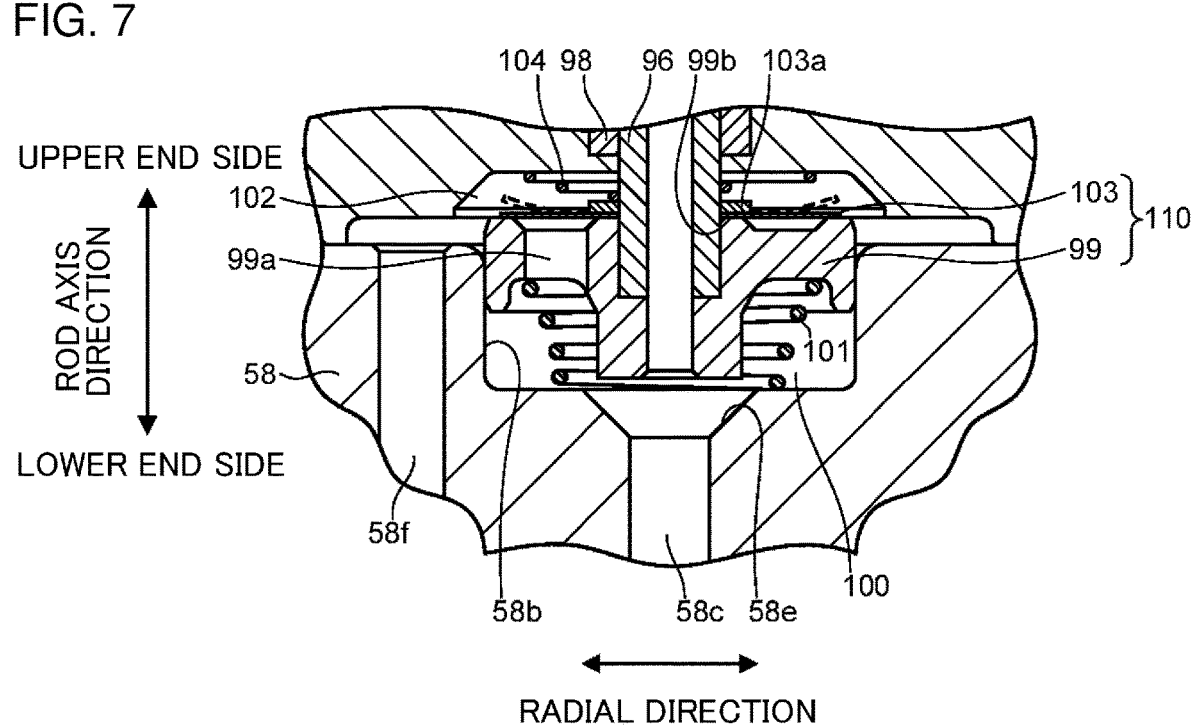
FIG. 7 is an enlarged longitudinal cross-sectional view of a main part of a pilot valve in case of failure of the damping force variable device of the first leg of the front fork which is the damping force variable shock absorber according to the first embodiment.

Here, the operation in case of the failure in which the solenoid 90 breaks down due to some causes and does not operate normally will be described. FIG. 7 is a drawing illustrating an enlarged longitudinal cross-section of a main part of the pilot valve 110 of the damping force variable device 50 of the first leg 10a of the front fork 10 which is the damping force variable shock absorber according to the first embodiment.

In case of the failure in which the solenoid 90 does not operates normally, the thrust (electromagnetic force) that moves the pilot valve 110 in the valve-closing direction (toward the lower end side) while resisting the spring 101 that biases the pilot valve 110 in the valve-opening direction (toward the upper end side) is not generated. Here, the spring constant of the spring 101 that biases the pilot valve 110 in the valve-opening direction is set to be larger than the spring constant of the spring 104 that biases the pilot valve body 99 in the valve-closing direction as described above.

Thus, the pilot valve 110 moves in the valve-opening direction by the biasing force of the spring 101 together with the fail-safe valve 103 that is in contact with the pilot valve body 99. As illustrated in FIG. 7, when the pilot valve 110 including the pilot valve body 99 and the fail-safe valve 103 is moved to its full extent in the valve-opening direction (when the spring 104 is in a full compression state) in case of the failure or the like, the fail-safe valve 103 is fixed with an inner circumference thereof sandwiched between the pilot valve body 99 and the spring 104 with a spring receiving seat 103a interposed. In particular, in case of the failure, since the solenoid 90 breaks down and does not operate normally, the thrust toward the lower end side applied by the solenoid 90 disappears. Moreover, the biasing force toward the lower end side applied by the spring 104 is weaker than the biasing force toward the upper end side applied by the spring 101. Thus, the pilot valve body 99 is substantially biased in the valve-opening direction by the elastic force of the spring 101 and the oil pressure of the oil. That is, the biasing means that biases the pilot valve body 99 in the valve-opening direction is the spring 101 and the oil pressure.

As described above, since the pilot valve body 99 is biased in the valve-opening direction by the spring 101 as well as the oil pressure, it is possible to easily create a state in which the pilot valve body 99 is moved in the valve-opening direction to the full extent in case of the failure.

In this state, the pilot valve body 99 is in a fully open state in relation to the valve seat member 58. Therefore, supposing that the fail-safe valve 103 is opened by being spaced from the pilot valve body 99 immediately when the oil flows due to the function of the check valve only as in the normal case, the internal pressure of the pilot chamber 61 and the passage between the pilot chamber 61 and the pilot valve 110 decreases abruptly, and thus the opening degree of the main valve 60 increases abruptly. Therefore, since the flow resistance of the oil passing through the main valve 60 decreases, the damping force in the compression-side stroke and the extension-side stroke decreases abruptly. Consequently, riding stability of the two-wheeled motor vehicle is impaired.

In the present embodiment, in the state illustrated in FIG. 7, in case of the failure, the pilot valve body 99 and the fail-safe valve 103 move toward the upper end side to their full extent. In this case, an inner circumference of the fail-safe valve 103 is fixed by being sandwiched between a supporting portion 99b of the pilot valve body 99 and the spring 104 with the spring receiving seat 103a interposed. Moreover, when the internal pressure of the pilot chamber 61 and the passage between the pilot chamber 61 and the pilot valve 110 exceeds a predetermined value, an outer circumference of the fail-safe valve 103 is deformed as depicted by dot lines in FIG. 7 and is away from the pilot valve body 99.

In this case, with the flow resistance of the gap between the fail-safe valve 103 and the pilot valve body 99, an abrupt decrease in the internal pressure of the pilot chamber 61 and the passage between the pilot chamber 61 and the pilot valve 110 is suppressed, and a certain degree of the internal pressure can be maintained. As a result, an abrupt increase in the opening degree of the main valve 60 is suppressed. Thus, the first leg 10a can maintain a certain level of the damping force in both the compression-side stroke and the extension-side stroke in case of the failure. In this case, by changing rigidity of the fail-safe valve 103 and an oil-pressure receiving area of the fail-safe valve 103, it is possible to change the internal pressure of the pilot chamber 61 and the passage between the pilot chamber 61 and the pilot valve 110 in case of the failure and to arbitrarily adjust the certain level of the damping force of the main valve 60 in case of the failure.

In case of the failure, during the compression-side stroke, similarly to the normal case described above, as indicated by the broken-line arrows in FIG. 5, a portion of the oil flowing from the piston-side oil chamber S1 into the gap 67 through the oil hole 72b of the lower piston member 72 flows from the passage 63 on the outer circumference of the main valve 60 into the pilot chamber 61 through the oil hole 60a of the main valve 60. Moreover, during the extension-side stroke, as indicated by the broken-line arrows in FIG. 6, a portion of the oil flowing from the rod-side oil chamber S2 into the gap 67 through the oil hole 71a of the upper piston member 71 flows from the passage 63 on the outer circumference of the main valve 60 into the pilot chamber 61 through the oil hole 60a of the main valve 60.

The flow in the pilot passage 170, of a portion of the oil flowing into the gap 67 is the same for both the compression-side stroke and the extension-side stroke. Thus, the subsequent flow in the pilot passage 170 will be described with reference to the compression-side stroke in FIG. 5.

As indicated by the broken-line arrows in FIG. 5, a portion of the oil flowing into the pilot chamber 61 flows from the pilot chamber 61 into the space 100 of the valve seat member 58 through the oil hole (not illustrated) of the main valve member 59 and the oil holes 58d and 58c of the valve seat member 58. The pilot valve body 99 is in a fully open state in relation to the valve seat member 58.

Moreover, the oil flowing into the space 100 of the valve seat member 58 passes through the oil hole 99a of the pilot valve body 99 to push and open the fail-safe valve 103 while resisting the biasing force of the spring 104 to flow into the space 102 of the core 92. An abrupt decrease in the internal pressure of the pilot chamber 61 and the passage between the pilot chamber 61 and the pilot valve 110 is prevented by the flow resistance of the oil when passing through the fail-safe valve 103. As a result, an abrupt increase in the opening degree of the main valve 60 is prevented. Thus, an abrupt decrease of the damping force during the compression-side stroke and extension-side stroke is prevented by the flow resistance of the oil passing through the main valve 60, and therefore the riding stability of the two-wheeled motor vehicle is secured.

The oil flowing into the space 102 flows into the space 64 of the upper piston member 71 through the oil hole 58f of the valve seat member 58 and the passages 105 and 106. During the compression-side stroke, as indicated by the broken-line arrows in FIG. 5, the oil flowing into the space 64 joins the oil flowing through the main passage 150 to flow into the rod-side oil chamber S2. During the extension-side stroke, as indicated by the broken-line arrows in FIG. 6, the oil flowing into the space 64 joins the oil flowing through the main passage 160 to flow into the piston-side oil chamber S1.

During the compression-side stroke, a remaining portion of the oil flowing into the pilot chamber 61 flows into the gap 75 between the inner tube 21 and the piston 70 through the communication passage 72d as indicated by the one-dot-chain-line arrow in FIG. 5 as described above. Since the gap 75 communicates with the rod-side oil chamber S2, the remaining portion of the oil flowing into the pilot chamber 61 flows into the rod-side oil chamber S2.

During the compression-side stroke, the internal pressure (back pressure) of the pilot chamber 61 also decreases in case of the failure, and the force that presses the main valve 60 in the valve-closing direction (toward the upper end side) decreases. When the communication passage 72d is provided, the damping force during compression-side stroke is low as compared to when the communication passage 72d is not provided. Thus, it is possible to adjust the damping force to be relatively low as an initial setting during the compression-side stroke.

During the extension-side stroke, the oil flows into the pilot chamber 61 through the communication passage 72d in case of the failure. However, by controlling the sum of the flow resistance of the gap between the extension-side inlet check valve 55 and the upper piston member 71 and the flow resistance of the oil hole 60a to be equal to the flow resistance of the communication passage 72d, the increase in the internal pressure of the pilot chamber 61 due to the oil flowing into the pilot chamber 61 through the bypass passage 180 can be suppressed.

As described above, in the first leg 10a of the front fork 10 which is the damping force variable shock absorber according to the first embodiment, when the damping force is adjusted by solenoid-based electronic control using one damping force adjustment mechanism which includes one main valve 60, one pilot chamber 61, and one pilot valve 110, since the oil flows through the same main valve 60, pilot chamber 61, and pilot valve 110 for both the compression-side stroke and the extension-side stroke, the damping force is adjusted in the same manner for both the compression-side stroke and the extension-side stroke. Moreover, in case of the failure, the first leg 10a of the front fork 10 can maintain the certain level of the damping force for both the compression-side stroke and the extension-side stroke. In this case, in the first embodiment, since the communication passage 72d is provided, it is possible to adjust the damping force during the compression-side stroke only to be relatively low as an initial setting and to perform different adjustments during the compression-side stroke and the extension-side stroke as initial settings while maintaining compact structure of one damping force adjustment mechanism which includes one main valve 60, one pilot chamber 61, and one pilot valve 110 including one pilot valve body 99 and one fail-safe valve 103.

Second Embodiment

Figure 8:
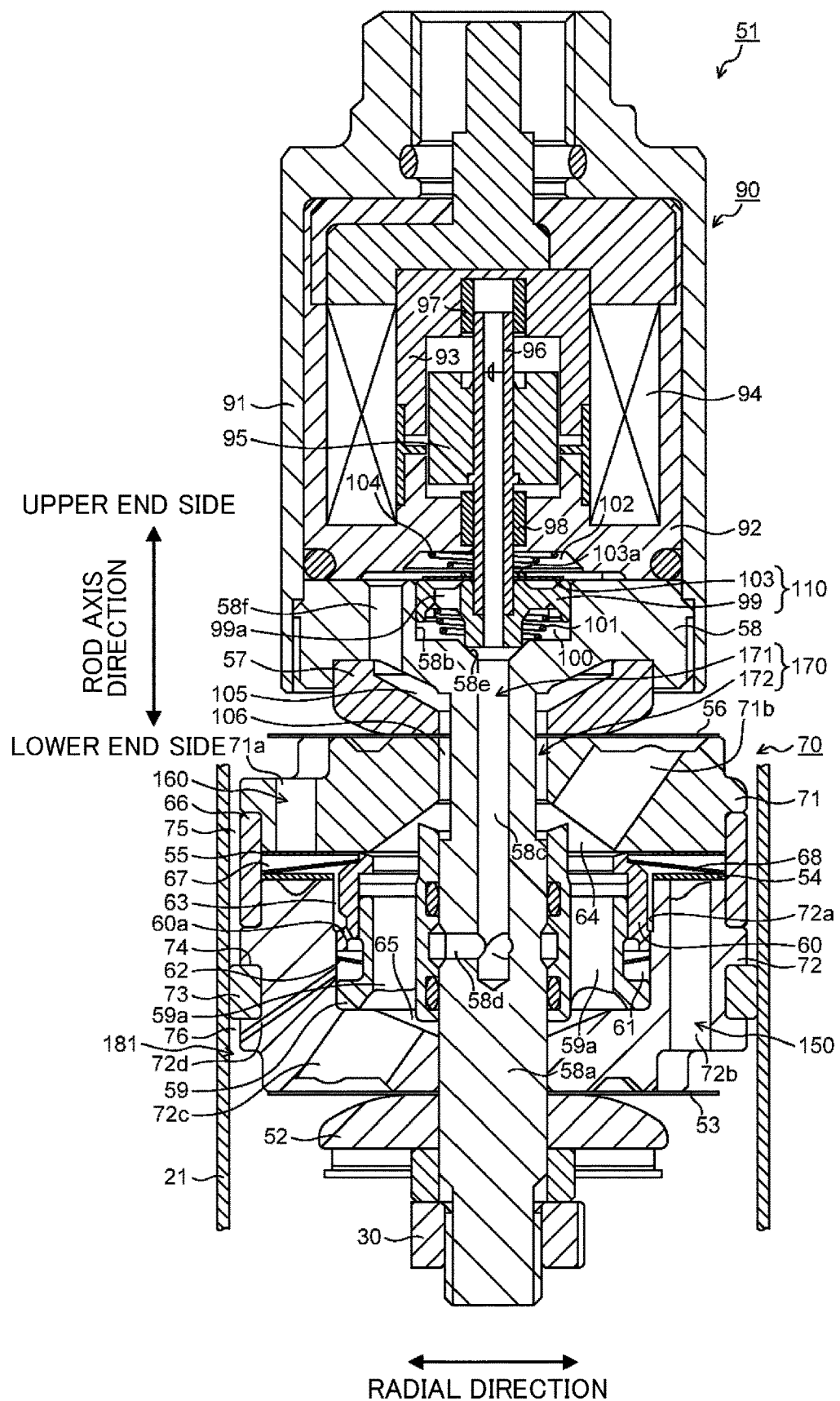
FIG. 8 is a longitudinal cross-sectional view of a damping force variable device of a first leg of a front fork which is a damping force variable shock absorber according to a second embodiment.

FIG. 8 is a drawing illustrating a longitudinal cross-section of a damping force variable device 51 of a first leg 10a of a front fork 10 which is a damping force variable shock absorber according to a second embodiment. FIG. 8 illustrates a portion of the inner tube 21 for the sake of convenience. Moreover, the same constituent elements as those of the first embodiment will be denoted by the same reference numerals and redundant description thereof will be omitted or simplified.

As illustrated in FIG. 8, the communication passage 72d of the damping force variable device 51 allows the pilot chamber 61 and the piston-side oil chamber S1 to communicate with each other. In this case, as illustrated in FIG. 8, one end of the communication passage 72d is open to a side surface of the lower piston member 72 below the sliding sealing member 73.

One end of the communication passage 72d is open to the gap 76 formed between the inner tube 21 and the piston 70 on the lower end side than the sliding sealing member 73. The gap 76 communicates with the piston-side oil chamber S1 (see FIG. 2).

Here, the communication passage 72d is not limited to a configuration in which the communication passage 72d allows the pilot chamber 61 and the piston-side oil chamber S1 to communicate with each other. The communication passage 72d may allow a passage between the pilot chamber 61 and the pilot valve 110 to communicate with the piston-side oil chamber S1. The passage between the pilot chamber 61 and the pilot valve 110 is the same as that of the first embodiment. In this connection, the passage including the communication passage 72d and the gap 76 is referred to as a bypass passage 181.

Figure 9:
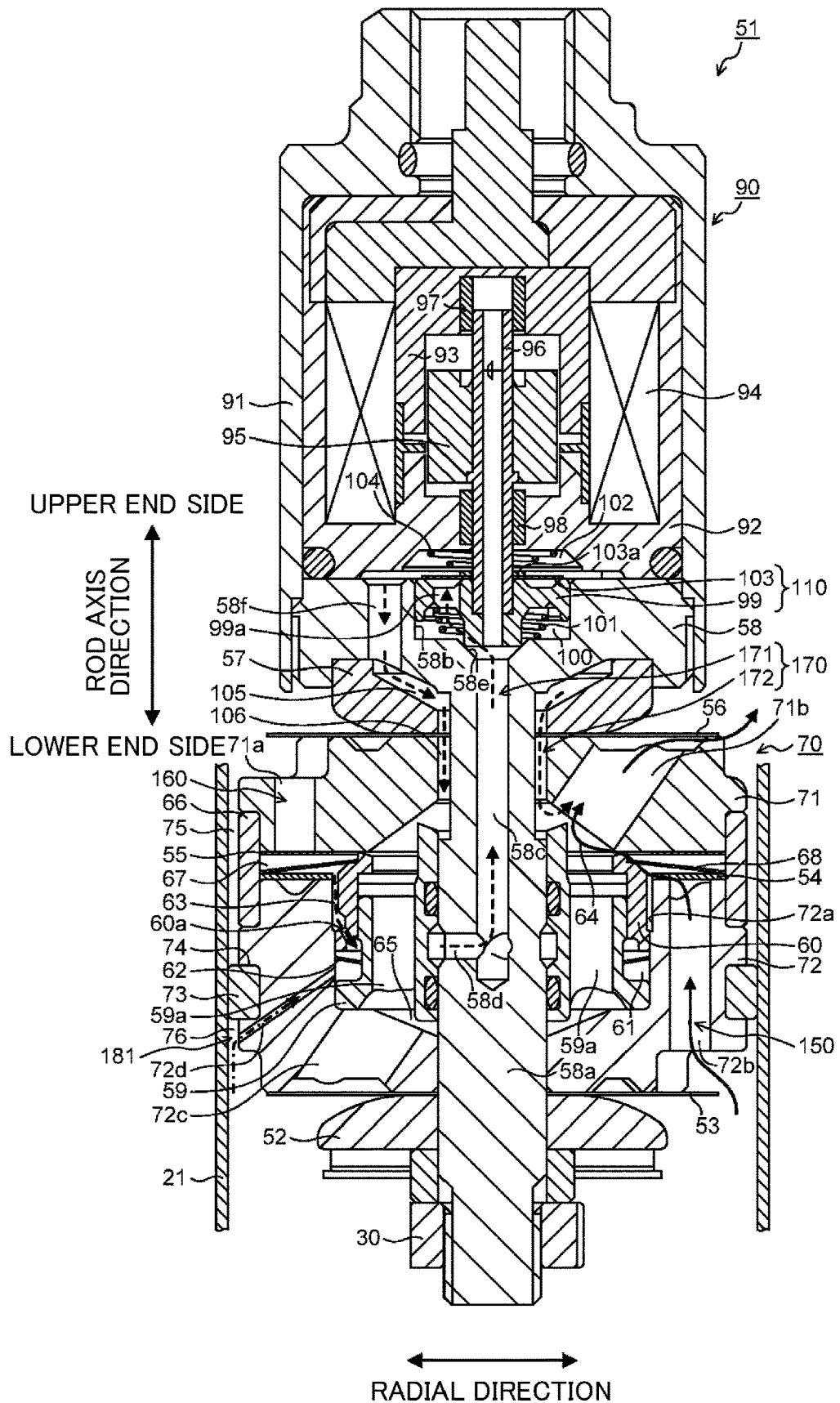
FIG. 9 is a longitudinal cross-sectional view illustrating the flow of the oil during the compression-side stroke of the damping force variable device of the first leg of the front fork which is the damping force variable shock absorber according to the second embodiment.
Figure 10:
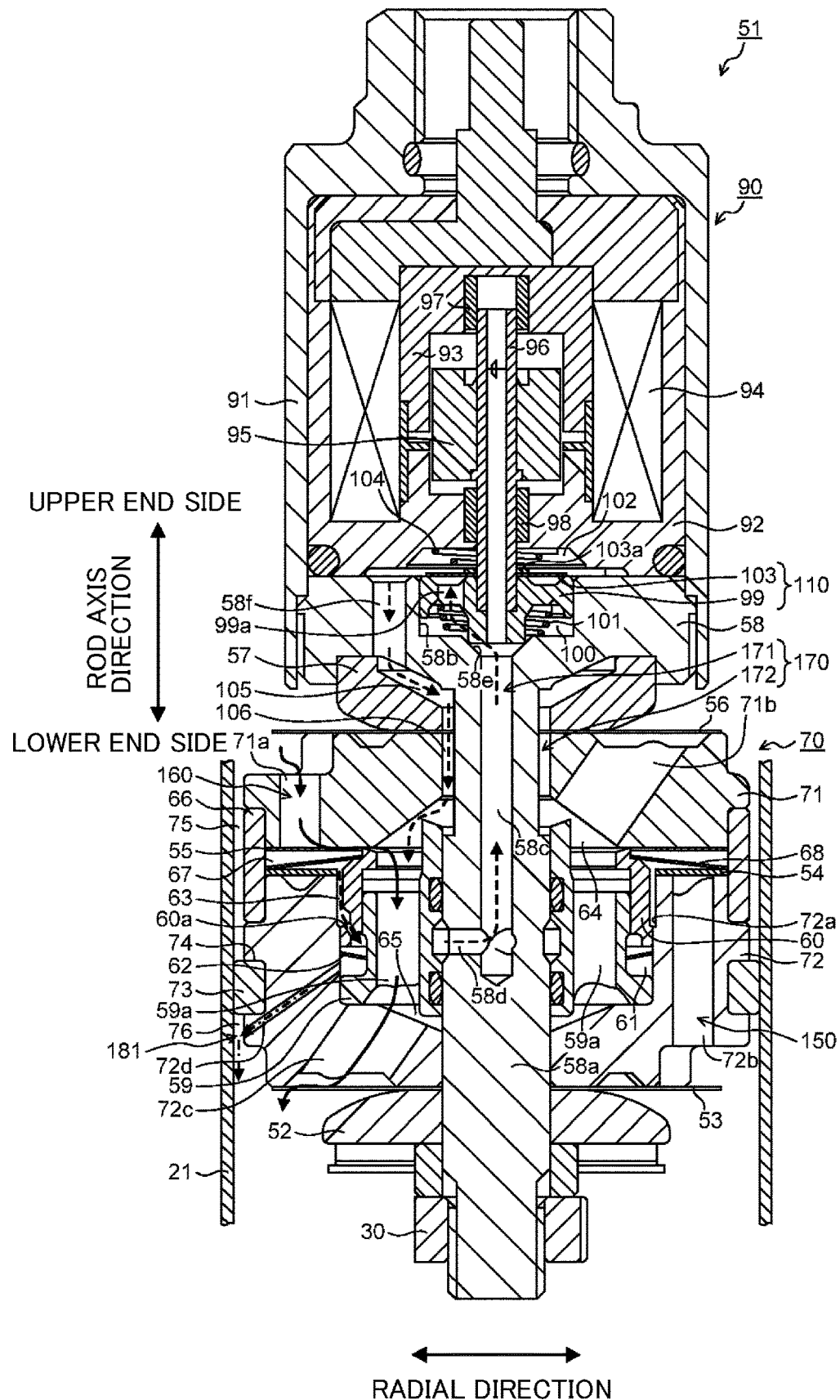
FIG. 10 is a longitudinal cross-sectional view illustrating the flow of the oil during the extension-side stroke of the damping force variable device of the first leg of the front fork which is the damping force variable shock absorber according to the second embodiment.

Next, operation during the compression-side stroke and the extension-side stroke of the first leg 10a having such a configuration will be described with reference to FIGS. 9 and 10. FIG. 9 is a longitudinal cross-sectional view illustrating the flow of the oil during the compression-side stroke of the damping force variable device 51 of the first leg 10a of the front fork 10 which is the damping force variable shock absorber according to the second embodiment. FIG. 10 is a longitudinal cross-sectional view illustrating the flow of the oil during the extension-side stroke of the damping force variable device 51 of the first leg 10a of the front fork 10 which is the damping force variable shock absorber according to the second embodiment. FIGS. 9 and 10 illustrate a portion of the inner tube 21 for the sake of convenience.

In the damping force variable device 51, the flow of the oil during the compression-side stroke and the extension-side stroke except the flow of the oil through the communication passage 72d is the same as the flow of the oil described with reference to FIGS. 5 and 6, for example. In this example, the flow different from the flow of the oil described above will be mainly described.

(Compression-Side Stroke)

First, the compression-side stroke will be described with reference to FIG. 9.

As indicated by broken-line arrows in FIG. 9, a portion of the oil flowing from the piston-side oil chamber S1 to the gap 67 through the oil hole 72b of the lower piston member 72 flows from passage 63 on the outer circumference of the main valve 60 into the pilot chamber 61 while passing through the oil hole 60a of the main valve 60. Moreover, as indicated by an one-dot-chain-line arrow in FIG. 9, a portion of the oil in the piston-side oil chamber S1 flows from the piston-side oil chamber S1 into the pilot chamber 61 through the communication passage 72d. That is, the flow of the oil in the piston-side oil chamber S1 branches into two passages, the oil flowing along the main passage 150 indicated by solid-line arrows in FIG. 9 and the oil flowing along the bypass passage 181 indicated by the one-dot-chain-line arrow in FIG. 9, near the extension-side outlet check valve 53.

The oil flowing into the pilot chamber 61 flows from the pilot chamber 61 into the space 100 of the valve seat member 58 through the oil hole (not illustrated) of the main valve member 59, the oil holes 58d and 58c of the valve seat member 58, and the gap between the pilot valve body 99 and the valve seat 58e. The oil flowing into the space 100 of the valve seat member 58 passes through the oil hole 99a of the pilot valve body 99 to push and open the fail-safe valve 103 while resisting the biasing force of the spring 104 to flow into the space 102 of the core 92. The oil flowing into the space 102 flows into the space 64 of the upper piston member 71 through the oil hole 58f of the valve seat member 58 and the passages 105 and 106 to join the oil flowing through the main passage 150. The joined oil flows into the rod-side oil chamber S2.

Here, pressure of the oil flowing into the pilot chamber 61 through the main passage 150 is reduced by flow resistance of a gap between the compression-side inlet check valve 54 and the lower piston member 72 and the flow resistance of the oil hole 60a in relation to internal pressure of the piston-side oil chamber S1. On the other hand, pressure of the oil flowing into the pilot chamber 61 through the bypass passage 181 is reduced by the flow resistance of the communication passage 72d in relation to the internal pressure of the piston-side oil chamber S1. Thus, in the first leg 10a, by controlling the sum of the flow resistance of the gap between the compression-side inlet check valve 54 and the lower piston member 72 and the flow resistance of the oil hole 60a to be equal to the flow resistance of the communication passage 72d, the increase in the internal pressure of the pilot chamber 61 due to the oil flowing into the pilot chamber 61 through the bypass passage 181 can be suppressed.

(Extension-Side Stroke)

Next, the extension-side stroke will be described with reference to FIG. 10.

As indicated by broken-line arrows in FIG. 10, a portion of the oil flowing from the rod-side oil chamber S2 into the gap 67 through the oil hole 71a of the upper piston member 71 converges with the oil flowing in the main passage 160 through the pilot passage 170. Moreover, as indicated by an one-dot-chain-line arrow in FIG. 10, a portion of the oil flowing through the pilot passage 170 flows from the pilot chamber 61 into the piston-side oil chamber S1 through the communication passage 72d. That is, a portion of the oil flowing through the pilot passage 170 flows into the piston-side oil chamber S1 through the bypass passage 181.

As a result, the internal pressure (the back pressure) of the pilot chamber 61 during the extension-side stroke decreases and thus force that presses the main valve 60 in the valve-closing direction (toward the upper end side) decreases. When the communication passage 72d is provided, the damping force during the compression-side stroke is low as compared to when the communication passage 72d is not provided. Thus, it is possible to adjust the damping force to be relatively low as an initial setting during the extension-side stroke.

(In Case of Failure)

The flow of the oil in case of the failure is basically the same as the flow of the oil in the damping force variable shock absorber according to the first embodiment. In this example, the flow different from the flow of the oil in case of the failure according to the first embodiment will be mainly described.

In the compression-side stroke and the extension-side stroke, as described above, a portion of the oil flowing from the gap 67 into the pilot chamber 61 flows from the pilot chamber 61 into the space 100 of the valve seat member 58 through the oil hole (not illustrated) of the main valve member 59 and the oil holes 58*d* and 58*c* of the valve seat member 58 as indicated by the broken-line arrows in FIGS. 9 and 10. The pilot valve body 99 is in a fully open state in relation to the valve seat member 58.

The oil flowing into the space 100 of the valve seat member 58 passes through the oil hole 99*a* of the pilot valve body 99 to push and open the fail-safe valve 103 while resisting the biasing force of the spring 104 to flow into the space 102 of the core 92. With the flow resistance of the oil when passing through the fail-safe valve 103, an abrupt decrease in the internal pressure of the pilot chamber 61 and the passage between the pilot chamber 61 and the pilot valve 110 is prevented. As a result, an abrupt increase in the opening degree of the main valve 60 is prevented. Thus, an abrupt decrease of the damping force during the compression-side stroke and the extension-side stroke is prevented by the flow resistance of the oil passing through the main valve 60, and therefore the riding stability of the two-wheeled motor vehicle is secured.

The oil flowing into the space 102 flows into the space 64 of the upper piston member 71 through the oil hole 58*f* of the valve seat member 58 and the passages 105 and 106. During the compression-side stroke, as indicated by the broken-line arrows in FIG. 9, the oil flowing into the space 64 joins the oil flowing through the main passage 150 to flow into the rod-side oil chamber S2. During the extension-side stroke, as indicated by the broken-line arrows in FIG. 10, the oil flowing into the space 64 joins the oil flowing through the main passage 160 to flow into the piston-side oil chamber S1.

During the compression-side stroke, the oil flows into the pilot chamber 61 through the communication passage 72*d* in case of the failure. However, by controlling the sum of the flow resistance of the gap between the compression-side inlet check valve 54 and the lower piston member 72 and the flow resistance of the oil hole 60*a* to be equal to the flow resistance of the communication passage 72*d*, the increase in the internal pressure of the pilot chamber 61 due to the oil flowing into the pilot chamber 61 through the bypass passage 181 can be suppressed.

On the other hand, during the extension-side stroke, a remaining portion of the oil flowing into the pilot chamber 61 flows into the gap 76 between the inner tube 21 and the piston 70 through the communication passage 72*d* as indicated by the one-dot-chain-line arrow in FIG. 10 as described above. Since the gap 76 communicates with the piston-side oil chamber S1, the remaining portion of the oil flowing into the pilot chamber 61 flows into the piston-side oil chamber S1.

During the extension-side stroke, the internal pressure (back pressure) of the pilot chamber 61 also decreases in case of the failure, and the force that presses the main valve 60 in the valve-closing direction (toward the upper end side) decreases. When the communication passage 72*d* is provided, the damping force during the extension-side stroke is low as compared to when the communication passage 72*d* is not provided. Thus, it is possible to adjust the damping force to be relatively low as an initial setting during the extension-side stroke.

As described above, in the first leg 10*a* of the front fork 10 which is the damping force variable shock absorber according to the second embodiment, when the damping force is adjusted by solenoid-based electronic control using one damping force adjustment mechanism which includes one main valve 60, one pilot chamber 61, and one pilot valve 110, since the oil flows through the same main valve 60, pilot chamber 61, and pilot valve 110 for both the compression-side stroke and the extension-side stroke, the damping force is adjusted in the same manner for both the compression-side stroke and the extension-side stroke. Moreover, in case of the failure, the first leg 10*a* of the front fork 10 can maintain a certain damping force for both the compression-side stroke and the extension-side stroke. In this case, in the second embodiment, since the communication passage 72*d* is provided, it is possible to adjust the damping force during the extension-side stroke only to be relatively low as an initial setting and to perform different adjustments during the compression-side stroke and the extension-side stroke as initial settings while maintaining compact structure of one damping force adjustment mechanism which includes one main valve 60, one pilot chamber 61, and one pilot valve 110 including one pilot valve body 99 and one fail-safe valve 103.

Meanwhile, in the first leg 10*a* of the front fork 10, the damping force variable device 50 of the first embodiment and the damping force variable device 51 of the second embodiment are provided inside the piston 70. However, the present invention is not limited to this, but the damping force variable device 50 of the first embodiment and the damping force variable device 51 of the second embodiment may naturally be provided outside the piston 70.

In the abovementioned embodiments, although examples in which the damping force variable shock absorber is applied to the front fork that suspends the front wheel of the two-wheeled motor vehicle in relation to the vehicle body have been illustrated, the present invention can be also applied to other types of shock absorbers of the two-wheeled motor vehicle, including a rear cushion that suspends a rear wheel of the two-wheeled motor vehicle in relation to the vehicle body.

Here, hydraulic circuits when the damping force variable shock absorber is applied to other types of shock absorbers of the two-wheeled motor vehicle will be described. FIGS. 11 to 14 are hydraulic circuit diagrams when the damping force variable shock absorber of the present invention is applied to other types of shock absorbers.

In FIGS. 11 to 14, the flow of the oil during the compression-side stroke is depicted by solid lines and the flow of the oil during the extension-side stroke is depicted by broken lines. FIGS. 11 to 14 illustrate the hydraulic circuits when the communication passage 72*d* corresponding to the first embodiment is provided. That is, the communication passage 72*d* allows the pilot chamber (not illustrated) or the passage between the pilot chamber (not illustrated) and the pilot valve (not illustrated) to communicate with the rod-side oil chamber S2.

Figure 11:
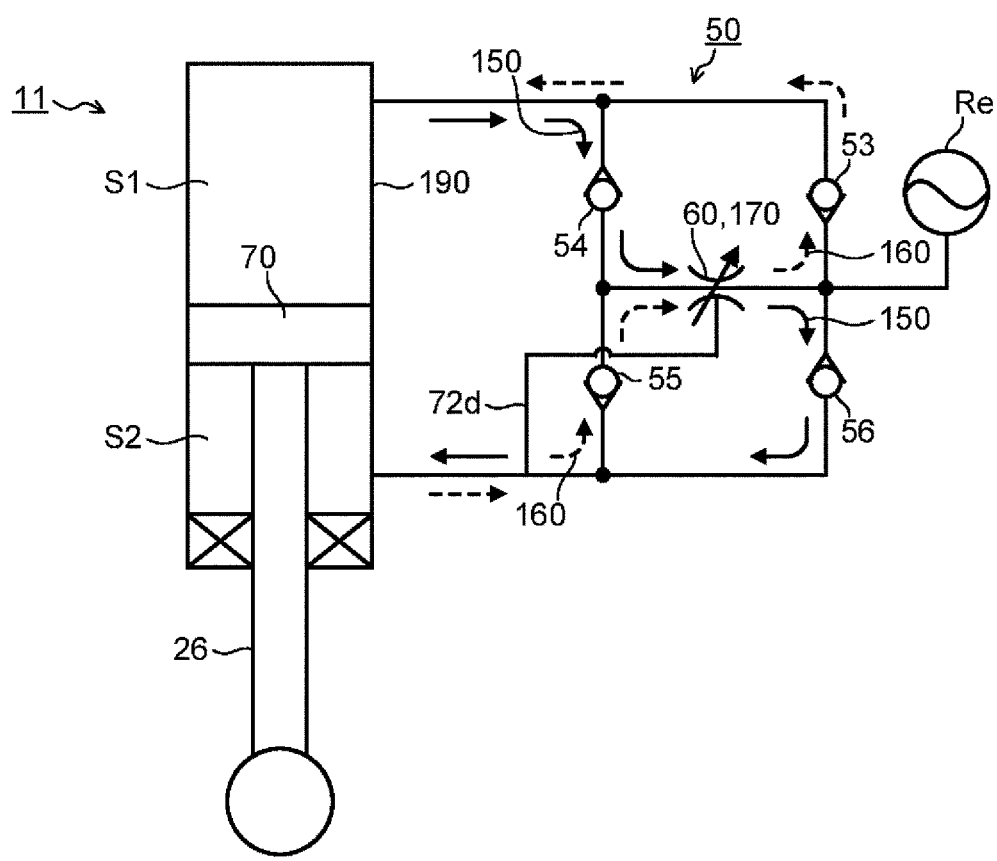
FIG. 11 is a hydraulic circuit diagram when the damping force variable shock absorber of one of the first and second embodiments is applied to another type of shock absorber.

(Damping Force Variable Shock Absorber 11 of FIG. 11)

As illustrated in FIG. 11, a damping force variable shock absorber 11 includes a cylinder 190 in which oil is enclosed, a piston 70 slidably fitted into the cylinder 190, a piston rod 26 having one end connected to the piston 70 and the other end extended outside the cylinder 190, a rod-side oil chamber S2 partitioned by the piston 70 and provided closer to the other end in the axial direction of the cylinder 190 than the piston 70, a piston-side oil chamber S1 provided closer to one end in the axial direction of the cylinder 190 than the piston 70, and a damping force variable device 50 that controls flow of the oil enclosed in the cylinder 190 so that damping force can be varied. The oil functions as fluid, the rod-side oil chamber S2 functions as a rod-side fluid chamber, and the piston-side oil chamber S1 functions as a piston-side fluid chamber.

The damping force variable device 50 includes a main valve 60 that opens and closes to control the flow of the oil caused by sliding of the piston 70 in the cylinder 190 to generate the damping force, a pilot chamber (not illustrated) into which a portion of the flow of the oil is introduced so that internal pressure is applied to the main valve 60 in a valve-closing direction, a pilot valve (not illustrated) that opens and closes to adjust internal pressure of the pilot chamber (not illustrated), and a communication passage 72d that allows the pilot chamber (not illustrated) or a passage (not illustrated) between the pilot chamber (not illustrated) and the pilot valve (not illustrated) to communicate with the rod-side oil chamber S2. Although the pilot chamber and the pilot valve are not illustrated, these elements are provided on a pilot passage 170 similarly to those illustrated in the first leg 10a of the front fork 10.

Moreover, the damping force variable device 50 includes a compression-side inlet check valve 54 provided on a main passage 150 on an upstream side of the main valve 60 and the pilot passage 170, a compression-side outlet check valve 56 provided on the main passage 150 on a downstream side of the main valve 60 and the pilot passage 170, an extension-side inlet check valve 55 provided on a main passage 160 on the upstream side of the main valve 60 and the pilot passage 170, an extension-side outlet check valve 53 provided on the main passage 160 on the downstream side of the main valve 60 and the pilot passage 170, and an oil storage chamber Re that communicates with a place which is on the downstream side of the main valve 60 and the pilot passage 170 and an upstream side of the compression-side outlet check valve 56 and the extension-side outlet check valve 53. The oil storage chamber Re functions as a fluid storage chamber.

In the damping force variable shock absorber 11, the damping force variable device 50 and the oil storage chamber Re are provided outside the piston 70 and further outside the cylinder 190 in which the piston 70 slides. The oil storage chamber Re has a function of supplying and discharging predetermined oil. The oil storage chamber Re may include a pouch-shaped bladder filled with gas, for example. Moreover, the communication passage 72d communicates with the pilot chamber (not illustrated) on the pilot passage 170 or a passage between the pilot chamber (not illustrated) and the pilot valve (not illustrated) and the rod-side oil chamber S2.

Moreover, the oil storage chamber Re communicates with a passage that branches on the downstream side of the main valve 60 and the pilot passage 170. Since the oil storage chamber Re communicates on the downstream side of the main valve 60 and the pilot passage 170, the oil damped by the main valve 60 is introduced into the oil storage chamber Re. That is, pressure of the rod-side oil chamber S2 depends on almost only pressure of an air chamber (not illustrated) present in the oil storage chamber Re and does not change depending on set passage resistance of the main valve 60. Thus, delay in change in the damping force during reversal from a compression-side stroke to an extension-side stroke can be prevented.

(1-1) Compression-Side Stroke

When a rear wheel of a two-wheeled motor vehicle moves upward and downward following unevenness on a road surface during riding the two-wheeled motor vehicle, the damping force variable shock absorber that suspends the rear wheel is extended and compressed. In the compression-side stroke in which the piston rod 26 moves upward in relation to the cylinder 190, the oil in the piston-side oil chamber S1 is compressed by the piston 70 and pressure therein increases. Then, the oil in the piston-side oil chamber S1 is guided to the damping force variable device 50.

The oil guided to the damping force variable device 50 flows into the rod-side oil chamber S2 through the main passage 150 during the compression-side stroke. At this time, with flow resistance of the oil when passing through the main valve 60, compression-side damping force is generated in the damping force variable shock absorber. Here, a position at which the main passage 150 and the pilot passage 170 illustrated in FIG. 5 join corresponds to a position at which reference numerals of the main valve 60 and the pilot passage 170 are described on the damping force variable shock absorber 11 illustrated in FIG. 11.

Moreover, a portion of the oil flowing in the pilot passage 170 flows into the rod-side oil chamber S2 through the communication passage 72d.

Moreover, in the compression-side stroke, an amount of the oil corresponding to volume of the piston rod 26 advancing into the cylinder 190 is supplied from the piston-side oil chamber S1 to the oil storage chamber Re. In this way, a change in volume in the cylinder 190 resulting from the piston rod 26 advancing into the cylinder 190 is compensated.

(1-2) Extension-Side Stroke

In the extension-side stroke in which the piston rod 26 moves downward in relation to the cylinder 190, the piston 70 moves downward inside the cylinder 190 together with the piston rod 26. Thus, the oil in the rod-side oil chamber S2 is compressed by the piston 70 and pressure thereof increases. Then, the oil in the rod-side oil chamber S2 is guided to the damping force variable device 50.

The oil guided to the damping force variable device 50 flows into the piston-side oil chamber S1 through the main passage 160 during the extension-side stroke. At this time, with flow resistance of the oil when passing through the main valve 60, extension-side damping force is generated in the damping force variable shock absorber. Here, a position at which the main passage 160 and the pilot passage 170 illustrated in FIG. 6 join corresponds to the position at which the reference numerals of the main valve 60 and the pilot passage 170 are described on the damping force variable shock absorber 11 illustrated in FIG. 11.

Moreover, a portion of the oil in the rod-side oil chamber S2 flows into the pilot passage 170 through the communication passage 72d via the pilot chamber (not illustrated), for example.

Moreover, in the extension-side stroke, an amount of the oil corresponding to volume of the piston rod 26 exiting from the cylinder 190 is supplied from the oil storage chamber Re to the piston-side oil chamber S1. As a result, a change in volume in the cylinder 190 resulting from the piston rod 26 exiting from the cylinder 190 is compensated.

The damping force variable shock absorber 11 illustrated in FIG. 11 shows the communication passage 72d that communicates with the pilot chamber (not illustrated) on the pilot passage 170 or the passage between the pilot chamber (not illustrated) and the pilot valve (not illustrated) and the rod-side oil chamber S2 and corresponds to the first embodiment of the first leg 10a of the front fork 10. In this case, the same operational effects as operational effects of the damping force variable shock absorber illustrated in the first embodiment can be obtained. However, the present invention is not limited to this, and the second embodiment may naturally be applied to the damping force variable shock absorber 11 as the communication passage 72d which communicates with the pilot chamber (not illustrated) on the pilot passage 170 or the passage between the pilot chamber (not illustrated) and the pilot valve (not illustrated) and the piston-side oil chamber S1. In this case, the same operational effects as operational effects of the damping force variable shock absorber illustrated in the second embodiment can be obtained.

Figure 12:
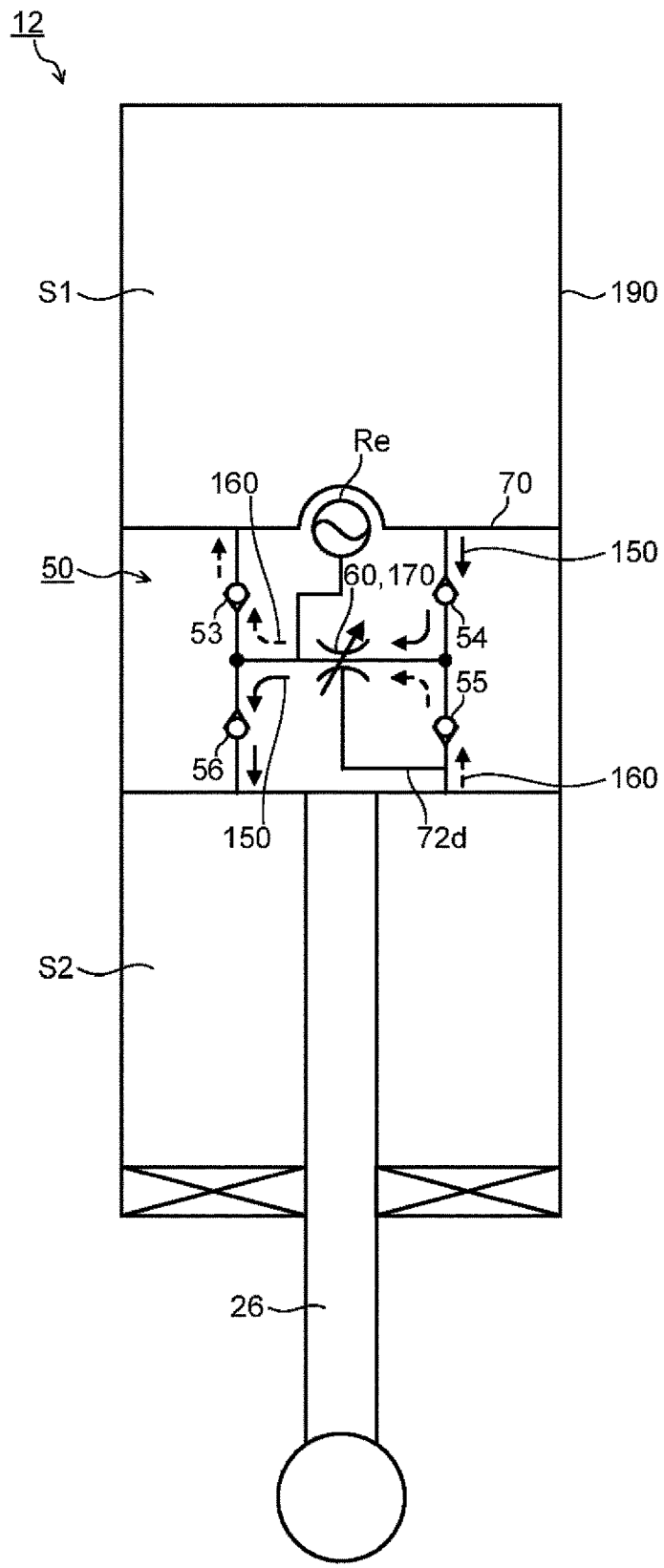
FIG. 12 is a hydraulic circuit diagram when the damping force variable shock absorber of one of the first and second embodiments is applied to another type of shock absorber.

(Damping Force Variable Shock Absorber 12 of FIG. 12)

As illustrated in FIG. 12, a damping force variable shock absorber 12 includes a cylinder 190 in which oil is enclosed, a piston 70 slidably fitted into the cylinder 190, a piston rod 26 having one end connected to the piston 70 and the other end extended outside the cylinder 190, a rod-side oil chamber S2 partitioned by the piston 70 and provided closer to the other end in the axial direction of the cylinder 190 than the piston 70, a piston-side oil chamber S1 provided closer to one end in the axial direction of the cylinder 190 than the piston 70, and a damping force variable device 50 that controls flow of the oil enclosed in the cylinder 190 so that damping force can be varied. The oil functions as fluid, the rod-side oil chamber S2 functions as a rod-side fluid chamber, and the piston-side oil chamber S1 functions as a piston-side fluid chamber.

The damping force variable device 50 includes a main valve 60 that opens and closes to control the flow of the oil caused by sliding of the piston 70 in the cylinder 190 to generate the damping force, a pilot chamber (not illustrated) in to which a portion of the flow of the oil is introduced so that internal pressure is applied to the main valve 60 in a valve-closing direction, a pilot valve (not illustrated) that opens and closes to adjust internal pressure of the pilot chamber (not illustrated), and a communication passage 72d that allows the pilot chamber (not illustrated) or a passage (not illustrated) between the pilot chamber (not illustrated) and the pilot valve (not illustrated) to communicate with the rod-side oil chamber S2. Although the pilot chamber and the pilot valve are not illustrated, these elements are provided on a pilot passage 170 similarly to those illustrated in the first leg 10a of the front fork 10.

Moreover, the damping force variable device 50 includes a compression-side inlet check valve 54 provided on a main passage 150 on an upstream side of the main valve 60 and the pilot passage 170, a compression-side outlet check valve 56 provided on the main passage 150 on a downstream side of the main valve 60 and the pilot passage 170, an extension-side inlet check valve 55 provided on a main passage 160 on the upstream side of the main valve 60 and the pilot passage 170, an extension-side outlet check valve 53 provided on a main passage 160 on the downstream side of the main valve 60 and the pilot passage 170, and an oil storage chamber Re that communicates with a place which is on the downstream side of the main valve 60 and the pilot passage 170 and an upstream side of the compression-side outlet check valve 56 and the extension-side outlet check valve 53. The oil storage chamber Re functions as a fluid storage chamber.

In the damping force variable shock absorber 12, the damping force variable device 50 and the oil storage chamber Re are provided inside the piston 70 in the cylinder 190. The present invention is not limited to this, and the oil storage chamber Re may be provided outside the piston 70 in the cylinder 190. Moreover, the oil storage chamber Re may be provided in an axle-side attachment member (not illustrated) or near the axle-side attachment member (not illustrated) by being extended from a passage that passes through the piston rod 26. Moreover, the communication passage 72d communicates with the pilot chamber (not illustrated) on the pilot passage 170 or a passage between the pilot chamber (not illustrated) and the pilot valve (not illustrated) and the rod-side oil chamber S2.

Moreover, the oil storage chamber Re communicates with a passage that branches on the downstream side of the main valve 60 and the pilot passage 170. Since the oil storage chamber Re communicates on the downstream side of the main valve 60 and the pilot passage 170, the oil damped by the main valve 60 is introduced into the oil storage chamber Re. That is, pressure of the rod-side oil chamber S2 depends on almost only pressure of an air chamber (not illustrated) present in the oil storage chamber Re and does not change depending on set passage resistance of the main valve 60. Thus, delay in change in the damping force during reversal from a compression-side stroke to an extension-side stroke can be prevented.

(2-1) Compression-Side Stroke

The oil in the piston-side oil chamber S1, of which the pressure is increased by the piston rod 26 moving upward in relation to the cylinder 190 flows into the rod-side oil chamber S2 through the main passage 150 during compression-side stroke. At this time, with flow resistance of the oil when passing through the main valve 60, compression-side damping force is generated in the damping force variable shock absorber. Here, the position at which the main passage 150 and the pilot passage 170 illustrated in FIG. 5 join corresponds to a position at which reference numerals of the main valve 60 and the pilot passage 170 are described on the damping force variable shock absorber 12 illustrated in FIG. 12.

Moreover, a portion of the oil flowing in the pilot passage 170 flows into the rod-side oil chamber S2 through the communication passage 72d.

Moreover, in the compression-side stroke, an amount of the oil corresponding to volume of the piston rod 26 advancing into the cylinder 190 is supplied from the piston-side oil chamber S1 to the oil storage chamber Re. In this way, a change in volume in the cylinder 190 resulting from the piston rod 26 advancing into the cylinder 190 is compensated.

(2-2) Extension-Side Stroke

The oil in the rod-side oil chamber S2, of which the pressure is increased by the piston rod 26 moving downward in relation to the cylinder 190 flows into the piston-side oil chamber S1 through the main passage 160 during the extension-side stroke. At this time, with the flow resistance of the oil when passing through the main valve 60, extension-side damping force is generated in the damping force variable shock absorber. Here, a position at which the main passage 160 and the pilot passage 170 illustrated in FIG. 6 join corresponds to the position at which the reference numerals of the main valve 60 and the pilot passage 170 are described on the damping force variable shock absorber 12 illustrated in FIG. 12.

Moreover, a portion of the oil in the rod-side oil chamber S2 flows into the pilot passage 170 through the communication passage 72d via the pilot chamber (not illustrated), for example.

Moreover, in the extension-side stroke, an amount of the oil corresponding to volume of the piston rod 26 exiting from the cylinder 190 is supplied from the oil storage chamber Re to the piston-side oil chamber S1. As a result, a change in volume in the cylinder 190 resulting from the piston rod 26 exiting from the cylinder 190 is compensated.

The damping force variable shock absorber 12 illustrated in FIG. 12 shows the communication passage 72*d* that communicates with the pilot chamber (not illustrated) on the pilot passage 170 or the passage between the pilot chamber (not illustrated) and the pilot valve (not illustrated) and the rod-side oil chamber S2 and corresponds to the first embodiment of the first leg 10*a* of the front fork 10. In this case, the same operational effects as operational effects of the damping force variable shock absorber illustrated in the first embodiment can be obtained. However, the present invention is not limited to this, and the second embodiment may naturally be applied to the damping force variable shock absorber 12 as the communication passage 72*d* which communicates with the pilot chamber (not illustrated) on the pilot passage 170 or the passage between the pilot chamber (not illustrated) and the pilot valve (not illustrated) and the piston-side oil chamber S1. In this case, the same operational effects as operational effects of the damping force variable shock absorber illustrated in the second embodiment can be obtained.

Figure 13:
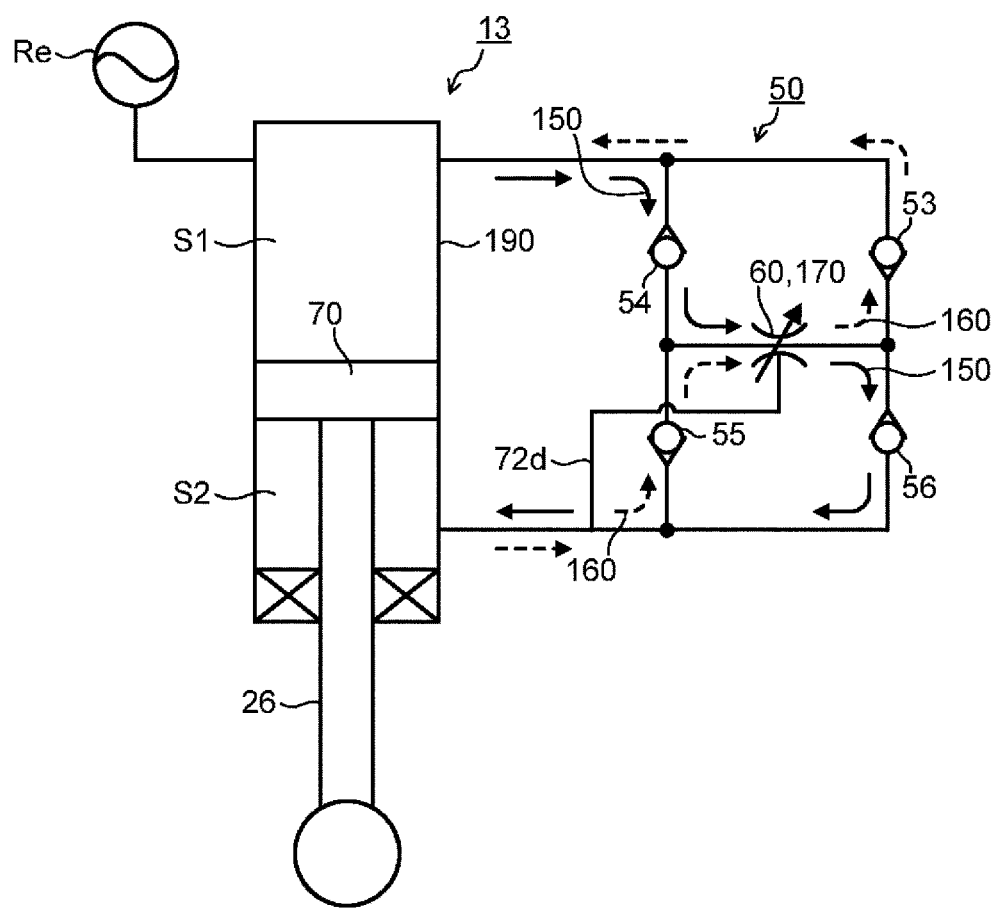
FIG. 13 is a hydraulic circuit diagram when the damping force variable shock absorber of one of the first and second embodiments is applied to another type of shock absorber.

(Damping Force Variable Shock Absorber 13 of FIG. 13)

As illustrated in FIG. 13, a damping force variable shock absorber 13 includes a cylinder 190 in which oil is enclosed, a piston 70 slidably fitted into the cylinder 190, a piston rod 26 having one end connected to the piston 70 and the other end extended outside the cylinder 190, a rod-side oil chamber S2 partitioned by the piston 70 and provided closer to the other end in an axial direction of the cylinder 190 than the piston 70, the piston-side oil chamber S1 provided closer to one end in the axial direction of the cylinder 190 than the piston 70, an oil storage chamber Re that communicates with the piston-side oil chamber S1, and a damping force variable device 50 that controls flow of the oil enclosed in the cylinder 190 so that damping force can be varied. The oil functions as fluid, the rod-side oil chamber S2 functions as a rod-side fluid chamber, the piston-side oil chamber S1 functions as a piston-side fluid chamber, and the oil storage chamber Re functions as a fluid storage chamber.

The damping force variable device 50 includes a main valve 60 that opens and closes to control the flow of the oil caused by sliding of the piston 70 in the cylinder 190 to generate the damping force, a pilot chamber (not illustrated) into which a portion of the flow of the oil is introduced so that internal pressure is applied to the main valve 60 in a valve-closing direction, a pilot valve (not illustrated) that opens and closes to adjust internal pressure of the pilot chamber (not illustrated), and a communication passage 72*d* that allows the pilot chamber (not illustrated) or a passage (not illustrated) between the pilot chamber (not illustrated) and the pilot valve (not illustrated) to communicate with the rod-side oil chamber S2. Although the pilot chamber and the pilot valve are not illustrated, these elements are provided on the pilot passage 170 similarly to those illustrated in the first leg 10*a* of the front fork 10.

Moreover, the damping force variable device 50 includes a compression-side inlet check valve 54 provided on the main passage 150 on an upstream side of the main valve 60 and the pilot passage 170, a compression-side outlet check valve 56 provided on the main passage 150 on a downstream side of the main valve 60 and the pilot passage 170, an extension-side inlet check valve 55 provided on the main passage 160 on an upstream side of the main valve 60 and the pilot passage 170, and an extension-side outlet check valve 53 provided on the main passage 160 on a downstream side of the main valve 60 and the pilot passage 170.

As illustrated in FIG. 13, the oil storage chamber Re is not provided in the damping force variable device 50 but is provided so as to communicate directly with the piston-side oil chamber S1. In this case, the damping force variable device 50 and the oil storage chamber Re are provided outside the piston 70 and furthermore outside the cylinder 190. An orifice or a check valve (not illustrated), for example, is provided in an inlet of the oil storage chamber Re to adjust an amount of introduced oil in order to allow an amount of oil corresponding to volume of the piston rod 26 advancing into the cylinder 190 to be introduced into the oil storage chamber Re. Moreover, the communication passage 72*d* communicates with the pilot chamber (not illustrated) on the pilot passage 170 or a passage between the pilot chamber (not illustrated) and the pilot valve (not illustrated) and the rod-side oil chamber S2.

(3-1) Compression-Side Stroke

The oil in the piston-side oil chamber S1, of which the pressure is increased by the piston rod 26 moving upward in relation to the cylinder 190 is guided into the damping force variable device 50.

The flow of the oil in the damping force variable device 50 except the flow of the oil introduced into the oil storage chamber Re is the same as the flow described in (1-1) Compression-Side Stroke. Here, the position at which the main passage 150 and the pilot passage 170 illustrated in FIG. 5 join corresponds to a position at which reference numerals of the main valve 60 and the pilot passage 170 are described on the damping force variable shock absorber 13 illustrated in FIG. 13.

Moreover, a portion of the oil flowing in the pilot passage 170 flows into the rod-side oil chamber S2 through the communication passage 72*d*.

Moreover, in the compression-side stroke, an amount of the oil corresponding to volume of the piston rod 26 advancing into the cylinder 190 is supplied from the piston-side oil chamber S1 to the oil storage chamber Re. In this way, a change in volume in the cylinder 190 resulting from the piston rod 26 advancing into the cylinder 190 is compensated.

(3-2) Extension-Side Stroke

The oil in the rod-side oil chamber S2, of which the pressure is increased by the piston rod 26 moving downward in relation to the cylinder 190 is guided to the damping force variable device 50. Moreover, the oil in the oil storage chamber Re is supplied to the piston-side oil chamber S1. As a result, a change in volume in the cylinder 190 resulting from the piston rod 26 exiting from the cylinder 190 is compensated.

The flow of the oil in the damping force variable device 50 except the flow of the oil delivered from the oil storage chamber Re is the same as the flow described in (2-2) Extension-Side Stroke. Here, a position at which the main passage 150 and the pilot passage 170 illustrated in FIG. 6 join corresponds to a position at which reference numerals of the main valve 60 and the pilot passage 170 are described on the damping force variable shock absorber 13 illustrated in FIG. 13.

Moreover, a portion of the oil in the rod-side oil chamber S2 flows into the pilot passage 170 through the communication passage 72*d* via the pilot chamber (not illustrated), for example.

Moreover, in the extension-side stroke, an amount of the oil corresponding to volume of the piston rod 26 exiting from the cylinder 190 is supplied from the oil storage chamber Re to the piston-side oil chamber S1. As a result, a change in volume in the cylinder 190 resulting from the piston rod 26 exiting from the cylinder 190 is compensated.

The damping force variable shock absorber 13 illustrated in FIG. 13 shows the communication passage 72*d* that communicates with the pilot chamber (not illustrated) on the pilot passage 170 or the passage between the pilot chamber (not illustrated) and the pilot valve (not illustrated) and the rod-side oil chamber S2 and corresponds to the first embodiment of the first leg 10*a* of the front fork 10. In this case, the same operational effects as operational effects of the damping force variable shock absorber illustrated in the first embodiment can be obtained. However, the present invention is not limited to this, and the second embodiment may naturally be applied to the damping force variable shock absorber 13 as the communication passage 72*d* which communicates with the pilot chamber (not illustrated) on the pilot passage 170 or the passage between the pilot chamber (not illustrated) and the pilot valve (not illustrated) and the piston-side oil chamber S1. In this case, the same operational effects as operational effects of the damping force variable shock absorber illustrated in the second embodiment can be obtained.

Figure 14:
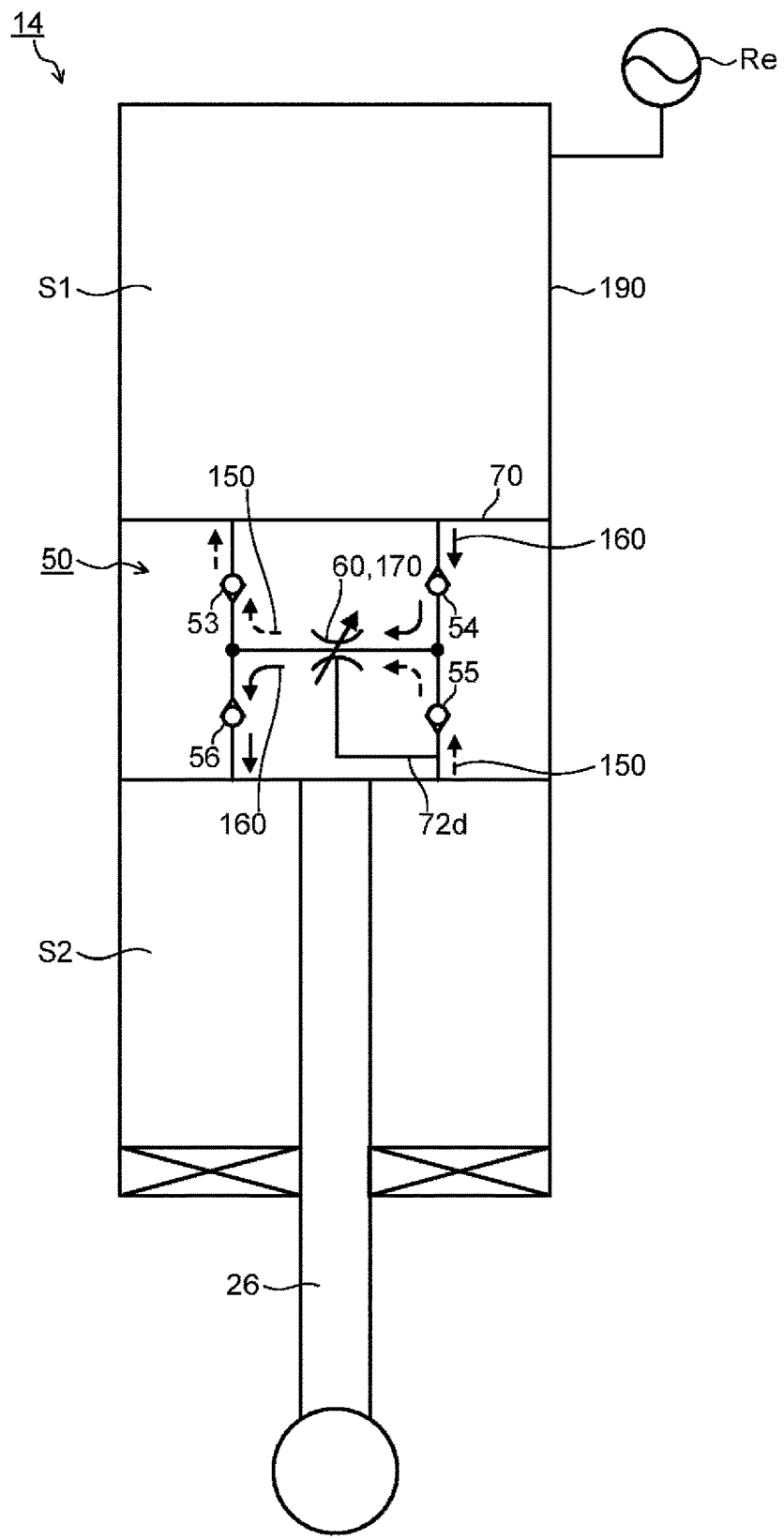
FIG. 14 is a hydraulic circuit diagram when the damping force variable shock absorber of one of the first and second embodiments is applied to another type of shock absorber.

(Damping Force Variable Shock Absorber 14 of FIG. 14)

As illustrated in FIG. 14, a damping force variable shock absorber 14 includes a cylinder 190 in which oil is enclosed, a piston 70 slidably fitted into the cylinder 190, a piston rod 26 having one end connected to the piston 70 and the other end extended outside the cylinder 190, a rod-side oil chamber S2 partitioned by the piston 70 and provided closer to the other end in the axial direction of the cylinder 190 than the piston 70, a piston-side oil chamber S1 provided closer to one end in the axial direction of the cylinder 190 than the piston 70, an oil storage chamber Re that communicates with the piston-side oil chamber S1, and a damping force variable device 50 that controls flow of the oil enclosed in the cylinder 190 so that damping force can be varied. The oil functions as fluid, the rod-side oil chamber S2 functions as a rod-side fluid chamber, the piston-side oil chamber S1 functions as a piston-side fluid chamber, and the oil storage chamber Re functions as a fluid storage chamber.

The damping force variable device 50 includes a main valve 60 that opens and closes to control the flow of the oil caused by sliding of the piston 70 in the cylinder 190 to generate the damping force, a pilot chamber (not illustrated) into which a portion of the flow of the oil is introduced so that internal pressure is applied to the main valve 60 in a valve-closing direction, a pilot valve (not illustrated) that opens and closes to adjust internal pressure of the pilot chamber (not illustrated), and a communication passage 72*d* that allows the pilot chamber (not illustrated) or a passage (not illustrated) between the pilot chamber (not illustrated) and the pilot valve (not illustrated) to communicate with the rod-side oil chamber S2. Although the pilot chamber and the pilot valve are not illustrated, these elements are provided on the pilot passage 170 similarly to those illustrated in the first leg 10*a* of the front fork 10.

Moreover, the damping force variable device 50 includes a compression-side inlet check valve 54 provided on a main passage 150 on an upstream side of the main valve 60 and the pilot passage 170, a compression-side outlet check valve 56 provided on the main passage 150 on a downstream side of the main valve 60 and the pilot passage 170, an extension-side inlet check valve 55 provided on a main passage 160 on the upstream side of the main valve 60 and the pilot passage 170, and an extension-side outlet check valve 53 provided on the main passage 160 on the downstream side of the main valve 60 and the pilot passage 170.

In the damping force variable shock absorber 14, some features of the damping force variable shock absorber 14 are incorporated into the piston 70. That is, the damping force variable device 50 in which the oil storage chamber Re is not included is provided inside the piston 70 in the cylinder 190. The oil storage chamber Re is provided outside the piston 70 and further outside the cylinder 190 in which the piston 70 slides. Moreover, the communication passage 72*d* communicates with the pilot chamber (not illustrated) on the pilot passage 170 or a passage between the pilot chamber (not illustrated) and the pilot valve (not illustrated) and the rod-side oil chamber S2.

That is, the damping force variable shock absorber 14 is the same as the damping force variable shock absorber 12 illustrated in FIG. 12 except that the oil storage chamber Re is not provided inside the piston 70. Moreover, the oil storage chamber Re of the damping force variable shock absorber 14 has the same configuration as that of the oil storage chamber Re illustrated in FIG. 13.

(4-1) Compression-Side Stroke

A specific flow of the oil except a flow of the oil introduced into the oil storage chamber Re is the same as the flow described in (2-1) Compression-Side Stroke. Here, a position at which the main passage 150 and the pilot passage 170 illustrated in FIG. 5 join corresponds to a position at which reference numerals of the main valve 60 and the pilot passage 170 are described on the damping force variable shock absorber 14 illustrated in FIG. 14.

Moreover, a portion of the oil flowing in the pilot passage 170 flows into the rod-side oil chamber S2 through the communication passage 72*d*.

Moreover, in the compression-side stroke, an amount of the oil corresponding to volume of the piston rod 26 advancing into the cylinder 190 is supplied from the piston-side oil chamber S1 to the oil storage chamber Re. In this way, a change in volume in the cylinder 190 resulting from the piston rod 26 advancing into the cylinder 190 is compensated.

(4-2) Extension-Side Stroke

The specific flow of oil except the flow of oil delivered from the oil storage chamber Re is the same as the flow described in (2-2) Extension-Side Stroke. Here, a position at which the main passage 150 and the pilot passage 170 illustrated in FIG. 6 join corresponds to a position at which reference numerals of the main valve 60 and the pilot passage 170 are described on the damping force variable shock absorber 14 illustrated in FIG. 14.

Moreover, the oil in the oil storage chamber Re is supplied to the piston-side oil chamber S1. As a result, a change in volume in the cylinder 190 resulting from the piston rod 26 exiting from the cylinder 190 is compensated.

Moreover, a portion of the oil in the rod-side oil chamber S2 flows into the pilot passage 170 through the communication passage 72*d* via the pilot chamber (not illustrated), for example.

Moreover, in the extension-side stroke, an amount of the oil corresponding to volume of the piston rod 26 exiting from the cylinder 190 is supplied from the oil storage chamber Re to the piston-side oil chamber S1. As a result, a change in volume in the cylinder 190 resulting from the piston rod 26 exiting from the cylinder 190 is compensated.

The damping force variable shock absorber 14 illustrated in FIG. 14 shows the communication passage 72*d* that communicates with the pilot chamber (not illustrated) on the pilot passage 170 or the passage between the pilot chamber (not illustrated) and the pilot valve (not illustrated) and the rod-side oil chamber S2 and corresponds to the first embodiment of the first leg 10a of the front fork 10. In this case, the same operational effects as operational effects of the damping force variable shock absorber illustrated in the first embodiment can be obtained. However, the present invention is not limited to this, and the second embodiment may naturally be applied to the damping force variable shock absorber 14 as the communication passage 72d which communicates with the pilot chamber (not illustrated) on the pilot passage 170 or the passage between the pilot chamber (not illustrated) and the pilot valve (not illustrated) and the piston-side oil chamber S1. In this case, the same operational effects as operational effects of the damping force variable shock absorber illustrated in the second embodiment can be obtained.

In FIGS. 11 to 14, although the damping force variable shock absorbers which include the communication passage 72d corresponding to the first embodiment have been illustrated, the damping force variable shock absorbers which include the communication passage 72d corresponding to the second embodiment may naturally be applied. In this case, the damping force variable shock absorbers have a circuit diagram which shows that the communication passage 72d allows the position at which the reference numerals of the main valve 60 and the pilot passage 170 are described to communicate with the piston-side oil chamber S1.

In the damping force variable shock absorbers 12 and 14 illustrated in FIGS. 12 and 14, the damping force variable device 50 and the solenoid 90 are provided inside the piston 70. Thus, the damping force variable device 50 and the solenoid 90 can be incorporated in the piston 70 in a compact structure and can be applied to a rear cushion of a two-wheeled motor vehicle, for example.

In the damping force variable shock absorbers 11 and 13 illustrated in FIGS. 11 and 13, the damping force variable device 50 and the solenoid 90 are provided outside the piston 70. Thus, by arranging the damping force variable device 50 and the solenoid 90 outside the piston 70, the damping force variable device 50 and the solenoid 90 can be disposed at an arbitrary position, and the degree of freedom of the layout thereof can be increased. Therefore, the degree of freedom of the arrangement of the solenoid 90 which is an actuator and the layout of harnesses can be increased.

In the present invention, FIGS. 11 to 14 illustrate an inverted damping force variable shock absorber in which the cylinder 190 is on an upper side and the piston rod 26 is on a lower side. However, the present invention is not limited to this but can be similarly applied to an erected damping force variable shock absorber in which the cylinder 190 is on the lower side and the piston rod 26 is on the upper side. The damping force variable shock absorbers illustrated in FIGS. 11 to 14 may naturally be applied to a front fork and a rear cushion regardless of whether the damping force variable shock absorber is an erected type or an inverted type.

In the abovementioned embodiments, although the present invention is applied to an inverted front fork in which an outer tube is attached to a vehicle body side and an inner tube is attached to an axle side, the present invention can be similarly applied to an upright front fork in which an inner tube is attached to a vehicle body side and an outer tube is attached to an axle side.

In the present embodiment, although the damping force variable shock absorber is applied to a two-wheeled motor vehicle, the present invention can be similarly applied to a damping force variable shock absorber that suspends a vehicle wheel of an optional vehicle other than the two-wheeled motor vehicle.

In summary, the embodiments generally provide a damping force variable shock absorber including: a cylinder in which fluid is enclosed; a piston slidably fitted into the cylinder; a piston rod having one end connected to the piston and the other end extended outside the cylinder; a rod-side fluid chamber partitioned by the piston and provided closer to the other end in an axial direction of the cylinder than the piston; a piston-side fluid chamber provided closer to one end in the axial direction of the cylinder than the piston; and a damping force variable device that controls flow of the fluid enclosed in the cylinder so that damping force can be varied. The damping force variable device includes: a main valve that opens and closes to control the flow of the fluid caused by sliding of the piston in the cylinder, thereby generating damping force; a pilot chamber into which a portion of the flow of the fluid is introduced so that internal pressure is applied to the main valve in a valve-closing direction; a pilot valve that opens and closes to adjust the internal pressure of the pilot chamber; and a communication passage that allows the pilot chamber or a passage between the pilot chamber and the pilot valve to communicate with the rod-side fluid chamber.

Alternatively, there may be provided a damping force variable shock absorber including: a cylinder in which fluid is enclosed; a piston slidably fitted into the cylinder; a piston rod having one end connected to the piston and the other end extended outside the cylinder; a rod-side fluid chamber partitioned by the piston and provided closer to the other end in an axial direction of the cylinder than the piston; a piston-side fluid chamber provided closer to one end in the axial direction of the cylinder than the piston; and a damping force variable device that controls flow of the fluid enclosed in the cylinder so that damping force can be varied. The damping force variable device includes: a main valve that opens and closes to control the flow of the fluid caused by sliding of the piston in the cylinder, thereby generating damping force; a pilot chamber into which a portion of the flow of the fluid is introduced so that internal pressure is applied to the main valve in a valve-closing direction; a pilot valve that opens and closes to adjust the internal pressure of the pilot chamber; and a communication passage that allows the pilot chamber or a passage between the pilot chamber and the pilot valve to communicate with the piston-side fluid chamber.

More specifically, the embodiments provide a damping force variable shock absorber including: an outer tube provided on a vehicle body side; an inner tube slidably inserted in an inner circumference of the outer tube; a first bush provided on an inner circumference on the axle side of the outer tube; a second bush provided on an outer circumference on a vehicle body side of the inner tube; an annular fluid chamber surrounded by the outer tube, the inner tube, the first bush, and the second bush; a bottomed cylindrical partition wall member, a portion of which is provided in the inner tube; a piston rod having a smaller cross-sectional area than a cross-sectional area of the annular fluid chamber, and having an end close to the vehicle body side attached to the outer tube, the piston rod being slidably inserted in the partition wall member; a piston provided in an end on the axle side of the piston rod and slidably provided in an inner circumference of the inner tube; a fluid storage chamber partitioned by the partition wall member in the inner tube and formed closer to the vehicle body side than the partition wall member; a fluid chamber partitioned by the partition wall member in the inner tube and formed closer to the axle side than the partition wall member; a rod-side fluid chamber partitioned by the piston in the fluid chamber and formed closer to the vehicle body side than the piston; a piston-side fluid chamber partitioned by the piston in the fluid chamber and formed closer to the axle side than the piston; a communication hole formed in the inner tube so as to allow the annular fluid chamber and the rod-side fluid chamber to communicate with each other; a check valve provided in the partition wall member so as to allow only flow of fluid from the fluid storage chamber to the rod-side fluid chamber; a throttle provided in the partition wall member so as to restrict the flow of the fluid between the fluid storage chamber and the rod-side fluid chamber; and a damping force variable device that controls the flow of the fluid enclosed in the outer tube and the inner tube so that damping force can be varied. The damping force variable device includes: a main valve that opens and closes to control the flow of the fluid caused by sliding of the piston in the inner tube, thereby generating damping force; a pilot chamber into which a portion of the flow of the fluid is introduced so that internal pressure is applied to the main valve in a valve-closing direction; a pilot valve that opens and closes to adjust the internal pressure of the pilot chamber; and a communication passage that allows the pilot chamber or a passage between the pilot chamber and the pilot valve to communicate with the rod-side fluid chamber.

Alternatively, there may be provided a damping force variable shock absorber including: an outer tube provided on a vehicle body side; an inner tube slidably inserted in an inner circumference of the outer tube; a first bush provided on an inner circumference on the axle side of the outer tube; a second bush provided on an outer circumference on a vehicle body side of the inner tube; an annular fluid chamber surrounded by the outer tube, the inner tube, the first bush, and the second bush; a bottomed cylindrical partition wall member, a portion of which is provided in the inner tube; a piston rod having a smaller cross-sectional area than a cross-sectional area of the annular fluid chamber, and having an end close to the vehicle body side attached to the outer tube, the piston rod being slidably inserted in the partition wall member; a piston provided in an end on the axle side of the piston rod and slidably provided in an inner circumference of the inner tube; a fluid storage chamber partitioned by the partition wall member in the inner tube and formed closer to the vehicle body side than the partition wall member; a fluid chamber partitioned by the partition wall member in the inner tube and formed closer to the axle side than the partition wall member; a rod-side fluid chamber partitioned by the piston in the fluid chamber and formed closer to the vehicle body side than the piston; a piston-side fluid chamber partitioned by the piston in the fluid chamber and formed closer to the axle side than the piston; a communication hole formed in the inner tube so as to allow the annular fluid chamber and the rod-side fluid chamber to communicate with each other; a check valve provided in the partition wall member so as to allow only flow of fluid from the fluid storage chamber to the rod-side fluid chamber; a throttle provided in the partition wall member so as to restrict the flow of the fluid between the fluid storage chamber and the rod-side fluid chamber; and a damping force variable device that controls the flow of the fluid enclosed in the outer tube and the inner tube so that damping force can be varied. The damping force variable device includes: a main valve that opens and closes to control the flow of the fluid caused by sliding of the piston in the inner tube, thereby generating damping force; a pilot chamber into which a portion of the flow of the fluid is introduced so that internal pressure is applied to the main valve in a valve-closing direction; a pilot valve that opens and closes to adjust the internal pressure of the pilot chamber; and a communication passage that allows the pilot chamber or a passage between the pilot chamber and the pilot valve to communicate with the piston-side fluid chamber.

What is claimed is:

1. A damping force variable shock absorber comprising:
a cylinder in which fluid is enclosed;
a piston slidably fitted into the cylinder;
a piston rod having one end connected to the piston and the other end extended outside the cylinder;
a rod-side fluid chamber partitioned by the piston and provided closer to the other end in an axial direction of the cylinder than the piston;
a piston-side fluid chamber provided closer to one end in the axial direction of the cylinder than the piston;
a damping force variable device that controls flow of the fluid enclosed in the cylinder so that a damping force can be varied;
an outer tube provided on a vehicle body side, the other end of the piston rod being attached to the outer tube;
an inner tube as the cylinder being slidably inserted in an inner circumference of the outer tube, the piston being slidably provided in an inner circumference of the inner tube;
a first bush provided on an inner circumference of the outer tube on an axle side;
a second bush provided on an outer circumference of the inner tube on the vehicle body side;
an annular fluid chamber surrounded by the outer tube, the inner tube, the first bush, and the second bush, and a cross-sectional area of the piston rod being smaller than a cross-sectional area of the annular fluid chamber;
a bottomed cylindrical partition wall member, a portion of which is provided in the inner tube, and the piston rod being slidably inserted in the partition wall member;
a fluid storage chamber partitioned by the partition wall member in the inner tube and formed closer to the vehicle body side than the partition wall member;
a fluid chamber partitioned by the partition wall member in the inner tube and formed closer to the axle side than the partition wall member, the rod-side fluid chamber being partitioned by the piston in the fluid chamber and formed closer to the vehicle body side than the piston, the piston-side fluid chamber partitioned by the piston in the fluid chamber and formed closer to the axle side than the piston;
a communication hole formed in the inner tube so as to allow the annular fluid chamber and the rod-side fluid chamber to communicate with each other;
a check valve provided in the partition wall member so as to allow only flow of fluid from the fluid storage chamber to the rod-side fluid chamber; and
a throttle provided in the partition wall member so as to restrict the flow of the fluid between the fluid storage chamber and the rod-side fluid chamber, wherein
the damping force variable device includes:
a main valve that opens and closes to control the flow of the fluid caused by sliding of the piston in the cylinder, thereby generating damping force;
a sole pilot chamber into which a portion of the flow of the fluid is introduced so that internal pressure is applied to the main valve in a valve-closing direction;
a pilot valve that opens and closes to adjust the internal pressure of the pilot chamber; and a communication passage that allows the pilot chamber or a passage between the pilot chamber and the pilot valve to communicate with the piston-side fluid chamber, and the communication passage is disposed such that the fluid flows from the piston-side fluid chamber to the pilot chamber via the communication passage during a compression-side stroke, and flows from the pilot chamber to the piston-side fluid chamber via the communication passage during an extension-side stroke.

2. The damping force variable shock absorber according to claim 1, wherein
the damping force variable device is provided inside the piston.

3. The damping force variable shock absorber according to claim 1, wherein
the damping force variable device further includes an actuator that generates thrust to the pilot valve in a valve-closing direction.

4. The damping force variable shock absorber according to claim 1, wherein
the piston is provided such that during the compression-side stroke, the fluid flows into the piston via a first fluid hole and a second fluid hole, both of which are formed in the piston, and
a portion of the fluid flowing into the piston via the first fluid hole and the fluid flowing into the piston via the second fluid hole flow to the pilot chamber.

5. The damping force variable shock absorber according to claim 1, wherein the piston is provided such that during the extension-side stroke, the fluid flows into the piston via a fluid hole formed in the piston, and
a portion of the fluid flowing into the piston flows to the pilot chamber.

6. The damping force variable shock absorber according to claim 4, wherein the piston is provided such that during the extension-side stroke, the fluid flows into the piston via a fluid hole formed in the piston, and
a portion of the fluid flowing into the piston flows to the pilot chamber.

7. A damping force variable shock absorber comprising:
a cylinder in which fluid is enclosed;
a piston slidably fitted into the cylinder;
a piston rod having one end connected to the piston and the other end extended outside the cylinder;
a rod-side fluid chamber partitioned by the piston and provided closer to the other end in an axial direction of the cylinder than the piston;
a piston-side fluid chamber provided closer to one end in the axial direction of the cylinder than the piston;
a damping force variable device that controls flow of the fluid enclosed in the cylinder so that a damping force can be varied;
an outer tube provided on a vehicle body side, the other end of the piston rod being attached to the outer tube;
an inner tube as the cylinder being slidably inserted in an inner circumference of the outer tube, the piston being slidably provided in an inner circumference of the inner tube;
a first bush provided on an inner circumference of the outer tube on an axle side;
a second bush provided on an outer circumference of the inner tube on the vehicle body side;
an annular fluid chamber surrounded by the outer tube, the inner tube, the first bush, and the second bush, and a cross-sectional area of the piston rod being smaller than a cross-sectional area of the annular fluid chamber;
a bottomed cylindrical partition wall member, a portion of which is provided in the inner tube, and the piston rod being slidably inserted in the partition wall member;
a fluid storage chamber partitioned by the partition wall member in the inner tube and formed closer to the vehicle body side than the partition wall member;
a fluid chamber partitioned by the partition wall member in the inner tube and formed closer to the axle side than the partition wall member, the rod-side fluid chamber being partitioned by the piston in the fluid chamber and formed closer to the vehicle body side than the piston, the piston-side fluid chamber partitioned by the piston in the fluid chamber and formed closer to the axle side than the piston;
a communication hole formed in the inner tube so as to allow the annular fluid chamber and the rod-side fluid chamber to communicate with each other;
a check valve provided in the partition wall member so as to allow only flow of fluid from the fluid storage chamber to the rod-side fluid chamber; and
a throttle provided in the partition wall member so as to restrict the flow of the fluid between the fluid storage chamber and the rod-side fluid chamber, wherein
the damping force variable device includes:
a main valve that opens and closes to control the flow of the fluid caused by sliding of the piston in the cylinder, thereby generating damping force;
a sole pilot chamber into which a portion of the flow of the fluid is introduced so that internal pressure is applied to the main valve in a valve-closing direction;
a pilot valve that opens and closes to adjust the internal pressure of the pilot chamber; and
a communication passage that allows the pilot chamber or a passage between the pilot chamber and the pilot valve to communicate with the rod-side fluid chamber, the communication passage is disposed such that the fluid flows from the pilot chamber to the rod-side fluid chamber via the communication passage during a compression-side stroke, and flows from the rod-side fluid chamber to the pilot chamber via the communication passage during an extension-side stroke, the piston is provided such that during the extension-side stroke, the fluid flows into the piston via a first fluid hole and a second fluid hole, both of which are formed in the piston, and
a portion of the fluid flowing into the piston via the first fluid hole and the fluid flowing into the piston via the second fluid hole flow to the pilot chamber.

8. A damping force variable shock absorber comprising:
a cylinder in which fluid is enclosed;
a piston slidably fitted into the cylinder;
a piston rod having one end connected to the piston and the other end extended outside the cylinder;
a rod-side fluid chamber partitioned by the piston and provided closer to the other end in an axial direction of the cylinder than the piston;
a piston-side fluid chamber provided closer to one end in the axial direction of the cylinder than the piston;
a damping force variable device that controls flow of the fluid enclosed in the cylinder so that a damping force can be varied;
an outer tube provided on a vehicle body side, the other end of the piston rod being attached to the outer tube;

an inner tube as the cylinder being slidably inserted in an inner circumference of the outer tube, the piston being slidably provided in an inner circumference of the inner tube;

a first bush provided on an inner circumference of the outer tube on an axle side;

a second bush provided on an outer circumference of the inner tube on the vehicle body side;

an annular fluid chamber surrounded by the outer tube, the inner tube, the first bush, and the second bush, and a cross-sectional area of the piston rod being smaller than a cross-sectional area of the annular fluid chamber;

a bottomed cylindrical partition wall member, a portion of which is provided in the inner tube, and the piston rod being slidably inserted in the partition wall member;

a fluid storage chamber partitioned by the partition wall member in the inner tube and formed closer to the vehicle body side than the partition wall member;

a fluid chamber partitioned by the partition wall member in the inner tube and formed closer to the axle side than the partition wall member, the rod-side fluid chamber being partitioned by the piston in the fluid chamber and formed closer to the vehicle body side than the piston, the piston-side fluid chamber partitioned by the piston in the fluid chamber and formed closer to the axle side than the piston;

a communication hole formed in the inner tube so as to allow the annular fluid chamber and the rod-side fluid chamber to communicate with each other;

a check valve provided in the partition wall member so as to allow only flow of fluid from the fluid storage chamber to the rod-side fluid chamber; and a throttle provided in the partition wall member so as to restrict the flow of the fluid between the fluid storage chamber and the rod-side fluid chamber, wherein the damping force variable device includes:

a main valve that opens and closes to control the flow of the fluid caused by sliding of the piston in the cylinder, thereby generating damping force;

a sole pilot chamber into which a portion of the flow of the fluid is introduced so that internal pressure is applied to the main valve in a valve-closing direction;

a pilot valve that opens and closes to adjust the internal pressure of the pilot chamber; and a communication passage that allows the pilot chamber or a passage between the pilot chamber and the pilot valve to communicate with the rod-side fluid chamber, the communication passage is disposed such that the fluid flows from the pilot chamber to the rod-side fluid chamber via the communication passage during a compression-side stroke, and flows from the rod-side fluid chamber to the pilot chamber via the communication passage during an extension-side stroke, the piston is provided such that during the compression-side stroke, the fluid flows into the piston and a portion of the fluid flowing into the piston flows to the pilot chamber through a fluid hole formed in the piston, the piston is provided such that during the extension-side stroke, the fluid flows into the piston via a first fluid hole and a second fluid hole, both of which are formed in the piston, and a portion of the fluid flowing into the piston via the first fluid hole and the fluid flowing into the piston via the second fluid hole flow to the pilot chamber.

* * * * *